US007003442B1

(12) United States Patent
Tsuda

(10) Patent No.: US 7,003,442 B1
(45) Date of Patent: Feb. 21, 2006

(54) DOCUMENT FILE GROUP ORGANIZING APPARATUS AND METHOD THEREOF

(75) Inventor: Hiroshi Tsuda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/266,863

(22) Filed: Mar. 12, 1999

(30) Foreign Application Priority Data

Jun. 24, 1998 (JP) .................................. 10-176749

(51) Int. Cl.
G06F 17/27 (2006.01)
(52) U.S. Cl. ...................... 704/9; 704/1; 704/10; 707/5; 707/532; 707/514; 707/351
(58) Field of Classification Search .................... 704/1, 704/9, 10; 707/530, 531, 532, 1–5, 514
See application file for complete search history.

(56) References Cited

U.S. PATENT DOCUMENTS

| | | | | |
|---|---|---|---|---|
| 5,371,807 A | * | 12/1994 | Register et al. ................. | 704/9 |
| 5,463,773 A | * | 10/1995 | Sakakibara et al. ............ | 704/9 |
| 5,732,259 A | * | 3/1998 | Konno ........................... | 707/3 |
| 5,732,260 A | * | 3/1998 | Nomiyama .................... | 707/5 |
| 5,761,496 A | * | 6/1998 | Hattori .......................... | 707/3 |
| 6,061,675 A | * | 5/2000 | Wical ............................ | 706/45 |
| 6,094,653 A | * | 7/2000 | Li et al. ......................... | 707/6 |
| 6,137,911 A | * | 10/2000 | Zhilyaev ....................... | 382/225 |
| 6,173,251 B1 | * | 1/2001 | Ito et al. ........................ | 704/7 |
| 6,233,575 B1 | * | 5/2001 | Agrawal et al. ............... | 707/6 |
| 6,240,378 B1 | * | 5/2001 | Imanaka et al. ............... | 704/9 |
| 6,243,723 B1 | * | 6/2001 | Ikeda et al. ................... | 707/514 |

FOREIGN PATENT DOCUMENTS

JP 8-153121 6/1996

OTHER PUBLICATIONS

Atsuo Kawai, "An Automatic Document Classification Method Based on a Semantic Category Frequency Analysis", *Transactions of Information Processing Society of Japan*, vol. 33, No. 9, (Sep. 15, 1992), pp. 1113-1122.

* cited by examiner

*Primary Examiner*—David D. Knepper
*Assistant Examiner*—Qi Han
(74) *Attorney, Agent, or Firm*—Staas & Halsey LLP

(57) ABSTRACT

A document organizing apparatus performs a statistical process and a character string process for keywords of documents, extracts an equivalent relation, a hierarchical relation, and an associative relation between keywords, and automatically creates a directory file with links of these relations. The user searches documents using the links of the directory file.

17 Claims, 26 Drawing Sheets

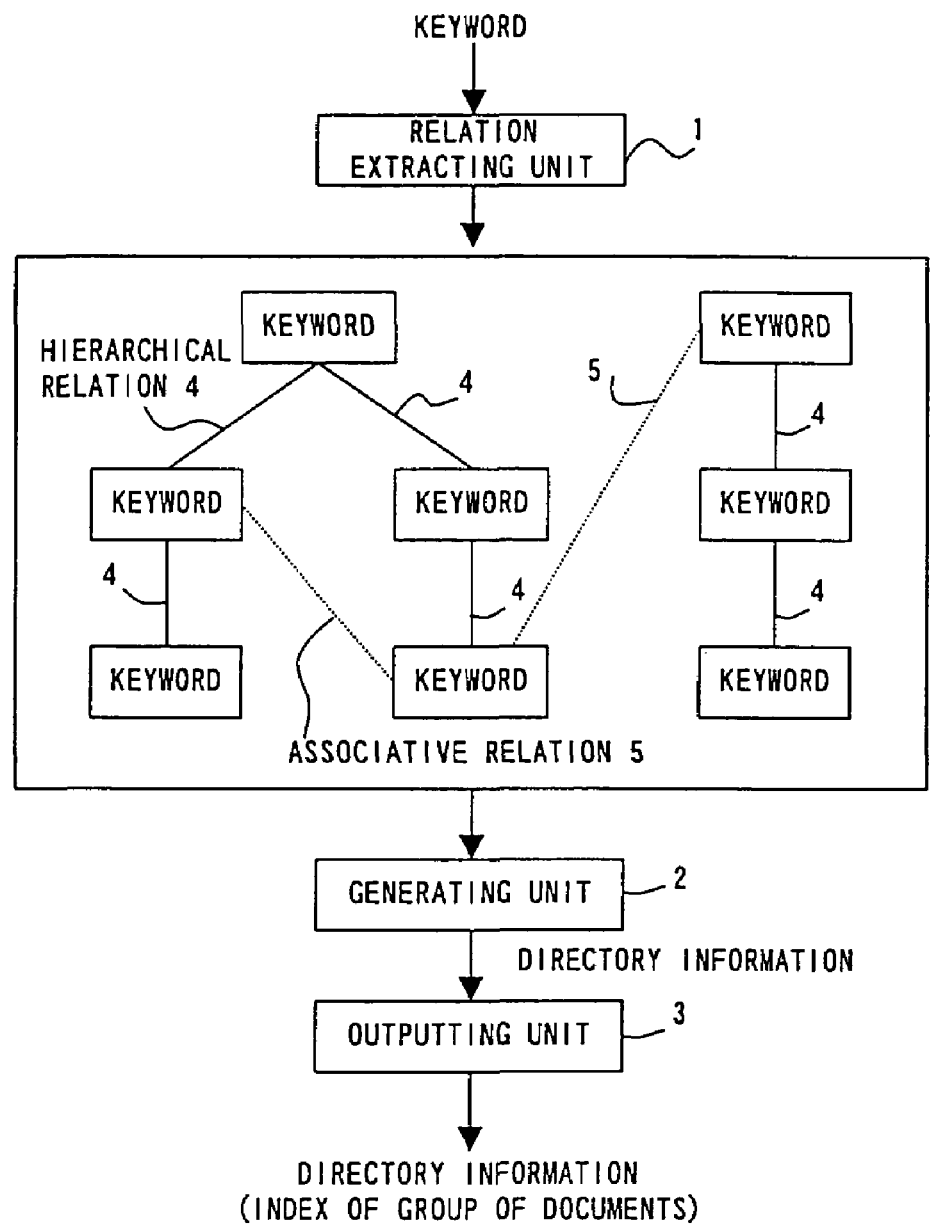
F I G. 1

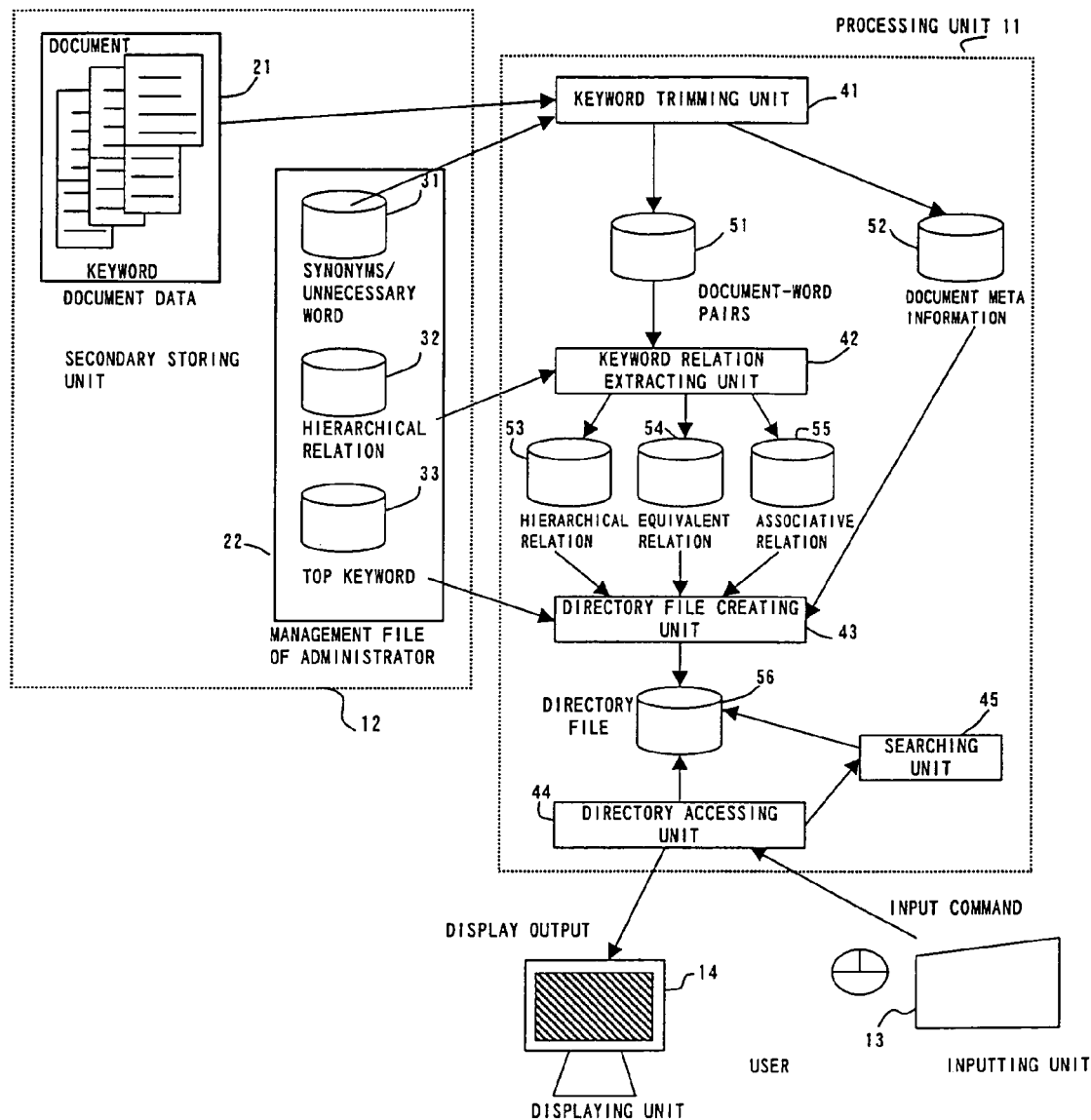
F I G. 2

SYNONYM/UNNECESSARY WORD TABLE 31

| REPRESENTATIVE WORD ID | SET OF IDS |
|---|---|
| 005 | 010, 021, 022 |
| 008 | 090 |
| nil | 077, 082 |
| . | . |
| . | . |
| . | . |

HIERARCHICAL RELATION TABLE 32

| HIGHER WORD ID | SET OF LOWER WORD IDS |
|---|---|
| 002 | 004, 008 |
| 009 | 032, 043 |
| . | . |
| . | . |
| . | . |

TOP KEYWORD ID LIST 33

| 001 |
| 008 |
| . |
| . |
| . |

FIG. 3

KEYWORD TABLE 62

| KID | KEYWORD | READING INFORMATION | UP | DOWN | Rel | Eq | PATH | new |
|-----|---------|---------------------|----|----|-----|----|------|-----|
| 000 | スポーツ | すぽーつ | 008 022 | 025 | 038 087 | | | 1 |
| 001 | 情報 | じょうほう | | 033 034 | 064 073 | | | 0 |
| ... | ... | | | | | | | |
| 081 | 運動 | うんどう | | 122 | 143 | 000 | | 0 |
| ... | ... | | | | | | | |

→ 53
→ 55
→ 54

DOCUMENT-WORD PAIR TABLE 61

| DOCUMENT ID | SEQUENCE OF KEYWORD IDS |
|-------------|-------------------------|
| 000 | 000 081 |
| 001 | 099 001 |
| ... | ... |

F I G. 4

DOCUMENT INFORMATION TABLE 52

| DOCUMENT ID | TITLE | DESCRIPTION | UPDATE DATE/TIME | LINK TO PRIMARY INFORMATION |
|---|---|---|---|---|
| 001 | ニュースの読み方 | comp,fjをmuleから… | 1998/2/10 15:38 | http://www.xxxx |
| 002 | | | | |
| ... | | | | |

F I G. 5

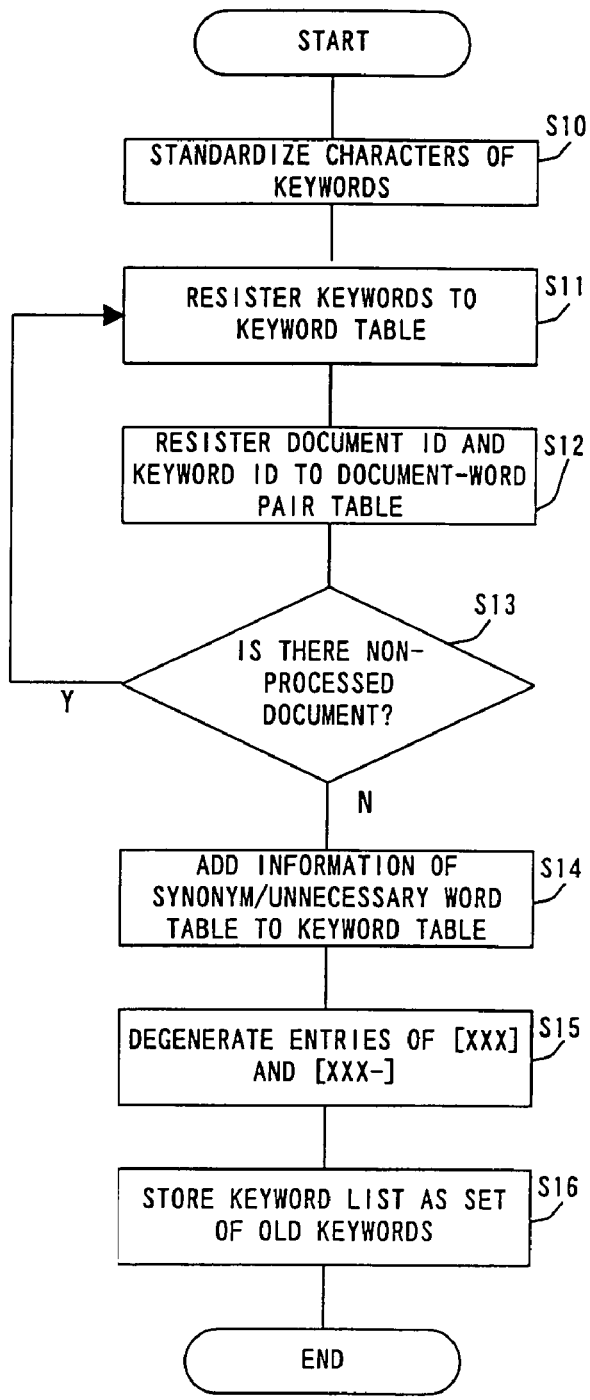
F I G. 7

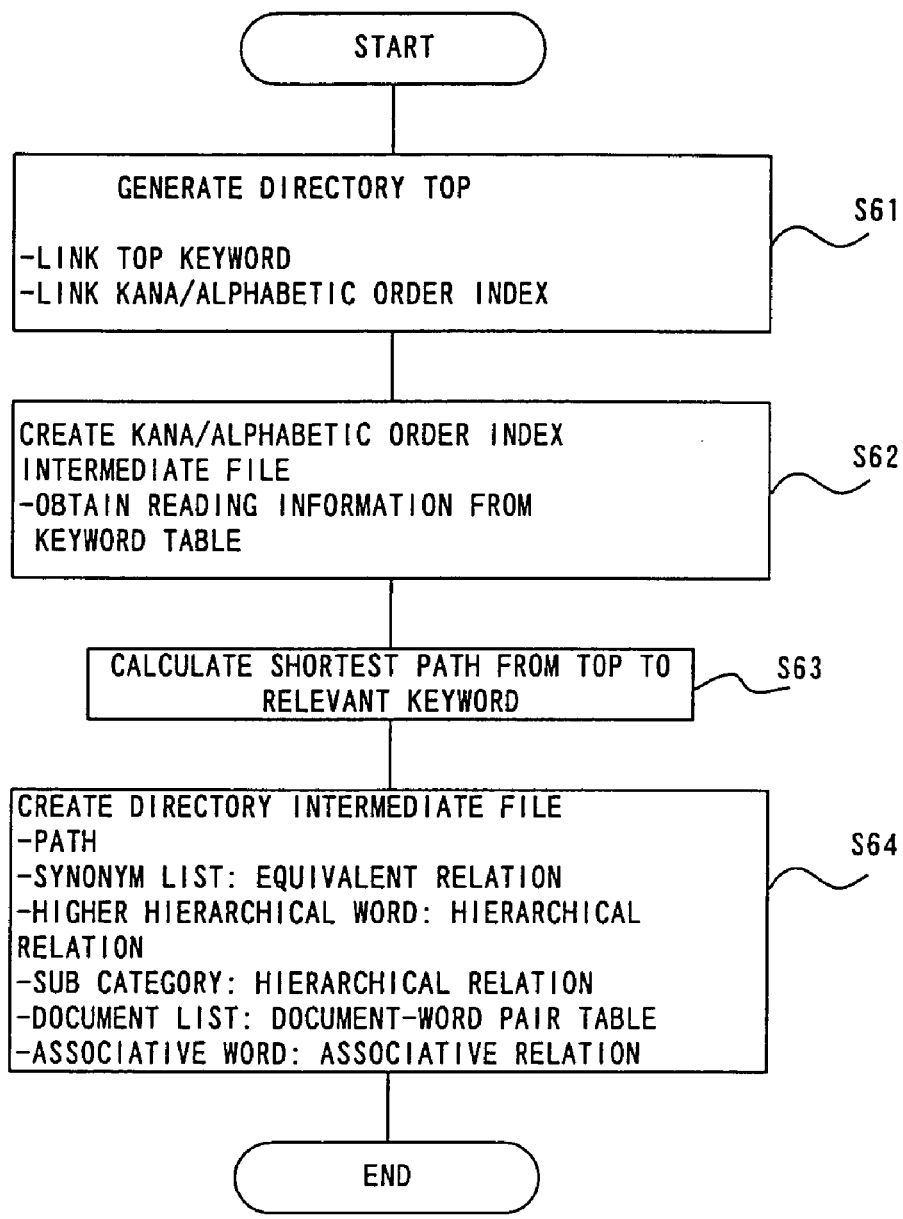
F I G. 1 7

A-Kore DIRECTORY (NUMBER OF RELATED WORDS/NUMBER OF DOCUMENTS)

- COMPUTER (23/24)
- SOFTWARE (34/24)
- PERSONAL COMPUTER (3/3)
- TECHNOLOGIES (14/12)
- NETWORKS (34/17)
- INFORMATION (27/16)
- BUSINESS (6/2)

- NEWS (4/4)
- ECONOMICS (3/)
- SOCIAL AFFAIRS (3/)
- SCIENCE (3/)
- WORLD (6/2)
- JAPAN (20/19)
- MEDIA (4/2)

- SERVICE (17/33)
- TV (3/)
- MUSIC (4/2)
- NOVELS (1/)
- GAMES (21/12)
- SPORTS (3/)
- TRAVEL (1/)
- LIFE STYLES (2/)

KANA ORDER INDEX

[KEYWORD SEARCH]

UPDATED 2/13/98 16:19  DOCUMENT COMPLETED

F I G. 2 1

"HOME PAGE"

PAGE | INTERNET | SERVICE NEWS | NEWSPAPER | SERVICE | URL | MAIL |
151 — TOP-WWW-

[RELATED WORD]

SUB TOPICS OF "HOME PAGE" (12)

- WWW PAGE @ 3 (2)
- NETWORK BUSINESS @ 1 (2)
- HTML (2)
- SOFTWARE COMPANIES (2)
- DATA FORMAT (2)
- DIGITAL (2)
- ELECTRONIC PUBLICATION (2)
- OPEN (2)
- KID'S BOOKS (2)
- IMAGES (2)
- ISSUANCE (2)
- MUSIC (2)

39 DOCUMENTS RELATING TO "HOME PAGE"

- WWW PAGE OF NATIONAL ASTRONOMICAL OBSERVATORY [TEXT]
  96/03/21
  (JAPAN | ELECTRONIC MAIL | CONTRIBUTION BY PROXY)
- PAGE FOR SEARCHING BOOKS [TEXT]
  95/05/23
  (BOOKS | SEARCH | TOPICS | CIRCULATION CENTER)
- WWW PAGE FOR ABC UNIV. ROBOT PROGRAM [TEXT]
  96/04/24
  (ACCESS | WWW PAGE | PREPARATION | AAA PLAZA OFFICE | SAKAMOTO)
- 7TH WORKSHOP OF DIGITAL LIBRARY [TEXT]

DOCUMENT COMPLETED

FIG. 22

A-Kore KANA ORDER INDEX (NUMERAL REPRESENTS NUMBER OF KEYWORDS)

| | | | | | | | | | |
|---|---|---|---|---|---|---|---|---|---|
| あ行 | あ28 | い25 | う5 | え11 | お16 | | | | |
| か行 | か59 | き15 | く9 | け26 | こ47 | | | | |
| さ行 | さ42 | し2 | す45 | せ34 | そ4 | | | | |
| た行 | た14 | ち11 | つ9 | て10 | と25 | | | | |
| な行 | な11 | に34 | ぬ1 | | | | | | |
| は行 | は14 | ひ7 | ふ11 | へ6 | ほ28 | | | | |
| ま行 | ま21 | み5 | む1 | め17 | も15 | | | | |
| や行 | や3 | ゆ10 | よ7 | | | | | | |
| ら行 | ら26 | り1 | る12 | れ9 | | | | | |
| わ行 | わ5 | | | | | | | | |
| ALPHABET | A36 | B13 | C57 | D27 | E26 | F32 | G17 | H21 | J19 | K7 L27 M41 N35 O14 P48 Q7 R23 S66 T28 U15 |
| | V9 | W24 | X2 | Y4 | Z1 | | | | | |
| SYMBOL etc. | SYMBOL7 | NUMERAL2 | | | | | | | | |
| FILE NAME | 1111 | 2111 | 355 | 411. | 511 | 611 | 711 | 811 | 911 | |

[KEYWORD SEARCH]

A-Kore DIRECTORY

DOCUMENT COMPLETED

F I G. 2 3

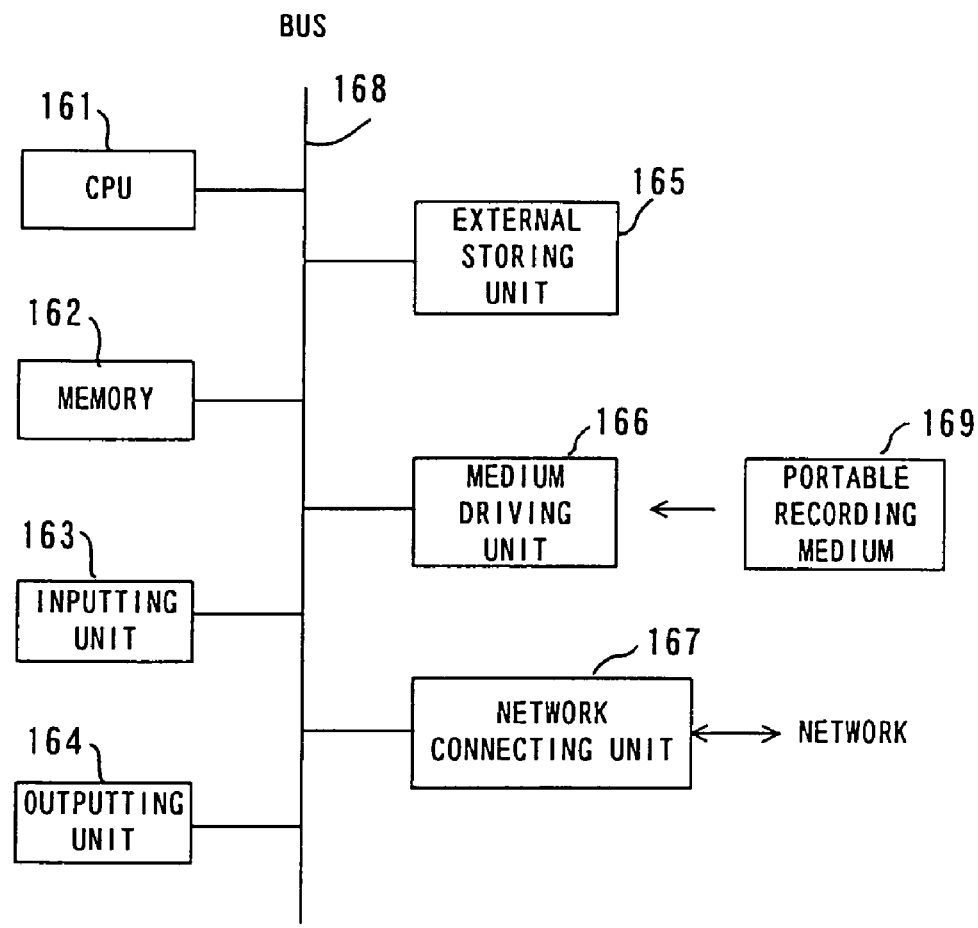
F I G. 2 5

DOCUMENT FILE GROUP ORGANIZING APPARATUS AND METHOD THEREOF

BACKGROUND OF THE INVENTION

1. Field of the Invention

The present invention relates to a document organizing apparatus and a method thereof for organizing a large number of document files stored in an information processing unit corresponding to the contents thereof.

2. Description of the Related Art

As computer networks have become widely used, a large amount of online document information has flooded the networks. Thus, the network users are expecting services that allow them to effectively and conveniently search and organize document information. For example, Internet home page searching services are roughly categorized into the following two types of services and the combination thereof.

(a) Directory services

These services hierarchically categorize and organize home pages.

(b) Full text searching services

These services search full text of pages collected by a robot (a searching program).

In a well-known directory service, a directory is created in the following method.

1. The creator of a home page submits a desired URL (Uniform Resource Locator) to the service provider.

2. The service provider hierarchically categorizes the submitted URL as a particular category and registers the categorized URL.

3. The hierarchical categories are unique to the service provider. The hierarchical categories are frequently varied. In addition, each home page is categorized into a plurality of categories.

In this service, ten and more professionals (they are referred to as surfers) create a directory and maintain information so as to provide the users with high quality and up-to-date information. However, it is difficult to constantly employ a sufficient number of surfers. In addition, when the user categorizes a large amount of electronic mail, it is difficult to manually create a directory. Thus, an automatic document categorizing system using a computer is desired.

In taxonomy, information is categorized with a tree structure. At a branch of the tree, child nodes are independent of each other. In addition, cross-categories are not permitted. Each information piece is placed at one position in the tree structure.

When a document is searched by such a taxonomical method, the document is categorized corresponding to the tree structure. Thus, only one path is set to one document. However, the categorizing criterion of the user does not always match that of the taxonomist. Consequently, the user may have difficulty in reaching a desired document. Thus, such a method is not always effective.

To solve such a problem, when a document is searched corresponding to categories, a plurality of categories may be assigned to one document as with the directory structures of Internet directory services. In a related art reference disclosed in "Document Information Categorizing Method and Document Information Categorizing Apparatus (translated title)" (Japanese Patent Laid-Open Publication No. 8-153121), hierarchical categorizes are created with keywords of a group of documents and each document is registered in a plurality of categories.

The automatic document categorizing system has been studied in the two approaches that follow. These two approaches have advantages and disadvantages. Thus, it is necessary to select one of these approaches or combine them corresponding to an application for use.

(a) Clustering

A given group of documents is divided into several suitable classes corresponding to the statistical/apparent relation of keywords. An advantage of this approach is in that categorized results corresponding to the features of the original group of documents are obtained regardless of conventional categories. A disadvantage of the approach is in that the accuracy of the automatic categorization is low.

(b) Categorization

In this approach, it is determined into which of the conventional categories a given document is to be categorized. As the conventional categories, a thesaurus or the like is used. In this approach, corresponding to the distribution of a keyword in a document, the document is categorized into a suitable category. An advantage of this approach is that the accuracy of the automatic categorization is higher than that of the clustering approach. A disadvantage of this approach is that the categorized results are general and the features of the original group of documents are not reflected in the categorized results.

In most of the Internet directory services, documents are manually categorized into conventional categories. When one class becomes large, it is manually divided into clusters.

In the above-described related art reference (Japanese Patent Laid-Open Publication No. 8-153121), documents are clustered corresponding to a keyword added thereto. In addition, to compensate for a disadvantage of the clustering approach by using a keyword, a conventional thesaurus is used. Using statistics of semantic attributes, the categorizing accuracy is improved. This method has been disclosed by Atsuo Kawai, "Automatic Document Categorizing System corresponding to Learning Results of Semantic Attributes (translated title)", Journal of Information Processing Society of Japan, Vol. 33, No. 9, pp. 1114–1122, 1992.

However, the above-described conventional document categorizing system has the following problems.

In a manual categorization, professionals who create and manage a directory are required. It is difficult for inexperienced users to categorize documents. When hypertexts of a directory are manually maintained, the labor work of the administrator becomes large. In addition, simple mistakes easily take place.

In addition, when documents are automatically categorized corresponding to taxonomy, each document is normally categorized into one category. Unless the categorizing criterion of the user matches that of the taxonomist, it is difficult for the user to reach the desired information. Moreover, in both the clustering approach and the categorization approach, documents cannot be fully automatically categorized. If there are unnecessary categories or if necessary categories are omitted, it is more difficult for the user to reach the desired information.

In addition, according to the paper of Kawai, the accuracy in the clustering approach is around 60%. In other words, the clustering approach is far from practical use. Moreover, in the categorization approach, since documents are categorized into general categories, they do not reflect the features of the original group of documents.

SUMMARY OF THE INVENTION

An object of the present invention is to provide a document organizing apparatus and a method thereof for automatically categorizing a large number of documents stored in an information processing unit with high accuracy corresponding to features of the documents.

A first aspect of the present invention is a document organizing apparatus comprising a relation extracting unit, a generating unit, and an outputting unit. The document organizing apparatus organizes the group of documents corresponding to keywords.

The relation extracting unit extracts a hierarchical relation and an associative relation between given keywords. The generating unit generates directory information for accessing the group of documents with the hierarchical relation and the associative relation as links. The outputting unit outputs the directory information.

The hierarchical relation extracted by the relation extracting unit represents an inclusion relation of the concepts of keywords. Although the associative relation is not tight as the hierarchical relation, the associative relation represents a relatively loose relation of which one keyword is associated with another keyword. The associative relation allows keywords that do not have a hierarchical relation to be correlated.

When an associative relation as a link is added to directory information that represents categorized results of a group of documents, documents can be flexibly accessed unlike with an approach using only a hierarchical relation. Thus, features of a group of documents can be more easily reflected to categories. Consequently, categorized results can be automatically obtained with high accuracy.

A second aspect of the present invention is an information organizing apparatus that comprises a relation extracting unit, a generating unit, and an outputting unit. The information organizing apparatus organizes any information corresponding to keywords.

The relation extracting unit extracts a hierarchical relation and an associative relation between given keywords. The generating unit generates directory information for accessing any information with the hierarchical relation and the associative relation as links. The outputting unit outputs the directory information.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a block diagram showing the principle of a document organizing apparatus according to the present invention;

FIG. 2 is a block diagram showing the structure of the document organizing apparatus;

FIG. 3 shows tables that represent the data structure of a management file;

FIG. 4 shows a document-word pair table and a keyword table;

FIG. 5 is a table showing the data structure of document metaphor information;

FIG. 7 is a flowchart showing the process of the keyword trimming unit;

FIG. 17 is a flowchart showing the process of a directory file creating unit;

FIG. 21 is a schematic diagram showing a top screen of the document directory;

FIG. 22 is an intermediate screen of the document directory;

FIG. 23 is a schematic diagram showing a top screen of a kana/alphabetic order index;

FIG. 25 is a block diagram showing the structure of an information processing unit.

DESCRIPTION OF PREFERRED EMBODIMENTS

Figure 6:
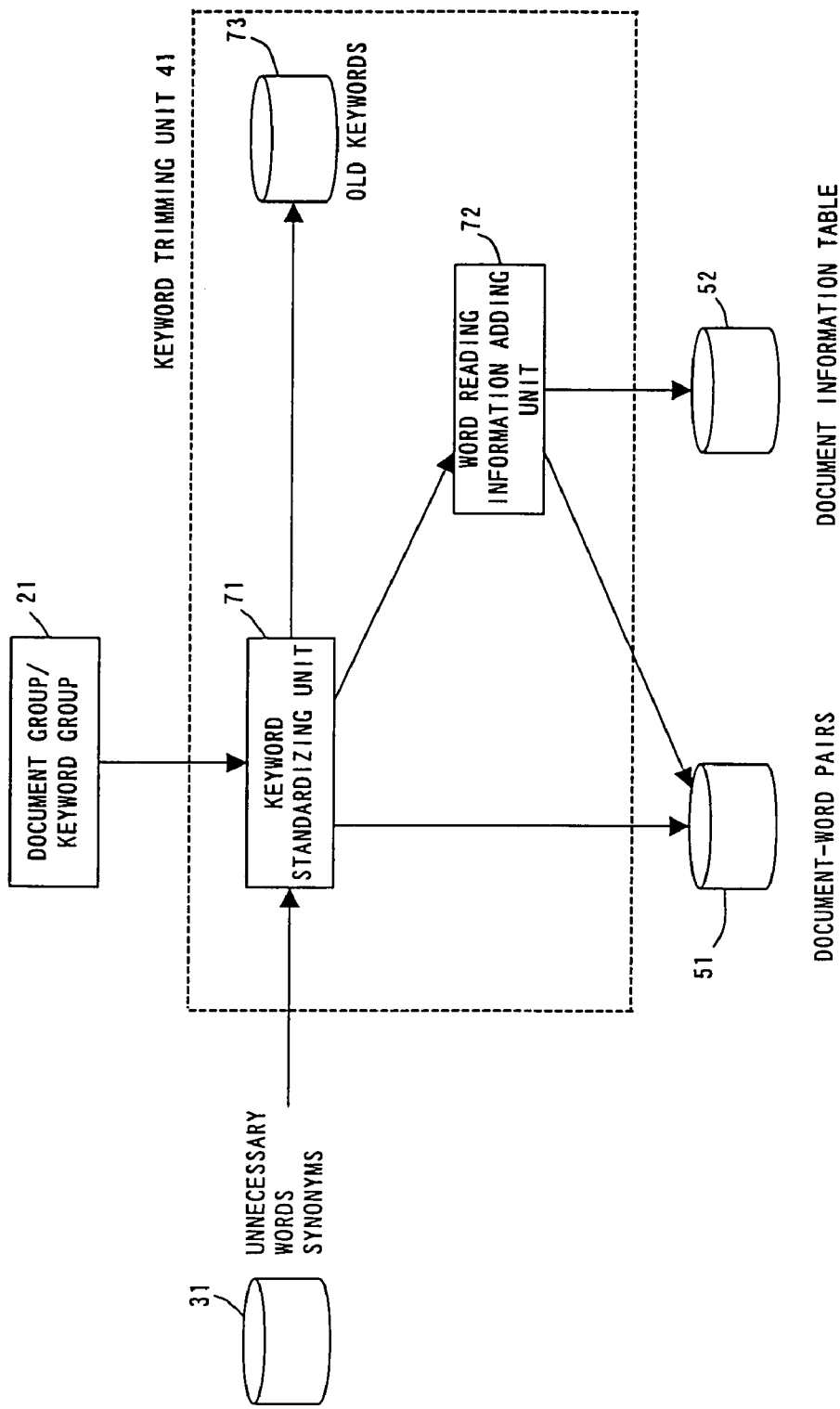
FIG. 6 is a block diagram showing the structure of a keyword trimming unit.

Next, with reference to the accompanying drawings, embodiments of the present invention will be described in detail. FIG. 1 is a block diagram showing the principle of a document organizing apparatus according to the present invention. The document organizing apparatus shown in FIG. 1 comprises a relation extracting unit 1, a generating unit 2, and an outputting unit 3. The document organizing apparatus organizes documents corresponding to keywords thereof.

The relation extracting unit 1 extracts a hierarchical relation 4 (denoted by a solid line) and an associative relation 5 (denoted by a dotted line). The generating unit 2 generates directory information for accessing the group of documents with the hierarchical relation 4 and the associative relation 5 as links. The outputting unit 3 outputs the directory information.

The hierarchical relation 4 extracted by the relation extracting unit 1 represents an inclusion relation of concepts of keywords. Although the associative relation 5 is not tight as the hierarchical relation, the associative relation 5 represents a comparatively loose relation of which one keyword is associated with another keyword. The associative relation 5 allows keywords that do not have the hierarchical relation 4 to be correlated.

The generating unit 2 generates directory information that represents the relation between keywords added to documents with the associative relation 5 as a link as well as the hierarchical relation 4. The generating unit 2 categorizes the group of documents corresponding to the directory information. The outputting unit 3 presents the directory information as an index of the group of documents to the user so that he or she can access the group of documents.

Since the associative relation 5 is added as a link to the directory information that represents the categorized results of the group of documents, the user can flexibly access the group of documents unlike with the structure using only the hierarchical relation 4. Thus, the features of the group of documents can be more easily reflected to categories. Consequently, categorized results can be automatically obtained with high accuracy.

The relation extracting unit 1 shown in FIG. 1 corresponds to a keyword relation extracting unit 42 shown in FIG. 2. The generating unit 2 corresponds to a directory file creating unit 43 shown in FIG. 2. The outputting unit 3 corresponds to a displaying unit 14 and a directory accessing unit 44 shown in FIG. 2.

According to the present invention, so as to minimize the manual work of the administrator, he or she gives a small part of a hierarchical relation of keywords to the document organizing apparatus manually or in a dictionary form. The document organizing apparatus performs a statistical process and a character string process corresponding to the given hierarchical relation, automatically extracts a relation between keywords, and automatically generates a directory file. To overcome the limit of the accuracy of the conventional categorizing method, the document organizing apparatus provides a directory with a variety of links that allows the user to properly approach a desired document regardless of categories of documents (hierarchical relation). Next, an outline of the operation of the document organizing apparatus will be described.

1. It is assumed that an input document is assigned a keyword that represents the contents thereof. In the present invention, the keyword assigning method is not limited. For example, an input document may be manually assigned a keyword. Alternatively, a keyword may be automatically extracted from the contents of an input document by a keyword extracting technique.

2. Next, the administrator explicitly gives a keyword sequence at the top of the directory, an equivalent relation of keywords, a hierarchical relation of keywords, and a list of unnecessary keywords to the document organizing apparatus.

3. The document organizing apparatus organizes keywords assigned to the documents corresponding to the list of unnecessary keywords explicitly given by the administrator and a keyword conversion rule (this operation is referred to as data cleaning operation).

4. The document organizing apparatus calculates sets of documents including a keyword and merges sets of documents corresponding to two or more keywords having an equivalent relation explicitly defined as synonyms by the administrator.

5. The document organizing apparatus calculates relations (an equivalent relation, a hierarchical relation, and an associative relation) between keywords.

6. The document organizing apparatus calculates a keyword sequence in the shortest distance from a top keyword given by the administrator to a particular keyword based on the hierarchical relation explicitly given by the administrator and the calculated hierarchical relation, as a path to the keyword (and a document that contains the keyword).

7. For a keyword without a path, the document organizing apparatus searches a keyword with a path that can be traced through the minimum number of higher hierarchical words from the keyword without a path. By adding the higher hierarchical word sequence to the path of the obtained keyword, a path of the original keyword is obtained.

8. For a keyword to which a path cannot be added at step 7, the document organizing apparatus assigns "others" as a top keyword and registers it as a lower hierarchical word of the top keyword.

9. The document organizing apparatus causes a word reading information adding unit to add the equivalent reading information to a keyword.

10. The document organizing apparatus creates hypertext of the directory with the hierarchical relation between keywords explicitly defined by the administrator, the relation between keywords automatically obtained, the path that is automatically calculated, the reading information of the keywords, and a keyword dividing unit (character sub-string generating unit).

11. The user performs the following operations with the created directory as an index of the group of documents.

Narrows the search range of documents with lower hierarchical words from the top level, Widens the search range with the higher hierarchical words, Checks the current position with the path and jumps to the higher hierarchical level, Jumps to another concept with a keyword with an associative relation, and Searches a keyword with a kana/alphabetic order index.

FIG. 2 is a block diagram showing the structure of the document organizing apparatus. The document organizing apparatus shown in FIG. 2 comprises a processing unit 11, a secondary storing unit 12, an inputting unit 13, and a displaying unit 14. For example, the processing unit 11 includes a CPU (Central Processing Unit) and a memory. The inputting unit 13 is, for example, a keyboard, a mouse, and so forth. The displaying unit 14 is, for example, a display or the like.

The secondary storing unit 12 stores data 21 of a group of electronic (digitized) documents and a management file 22. The management file 22 is created and managed with a dictionary or the like by the directory administrator. Each document of the data 21 is assigned a plurality of keywords. The management file 22 contains a set 31 of synonyms and unnecessary words, data 32 that represents a hierarchical relation of concepts of keywords, and a set 33 of keywords at the top of the directory.

Synonyms represent a set of keywords that have a relation of synonyms such as "computer" and "calculator". Unnecessary words represent a set of keywords that are not preferably used in the directory such as discriminative words. A hierarchical relation represents information that defines a higher hierarchical word such as "computer" and lower hierarchical words such as "hardware" and "software".

The processing unit 11 comprises a keyword trimming unit 41, a keyword relation extracting unit 42, a directory file creating unit 43, a directory accessing unit 44, and a searching unit 45. These members correspond to software components described as programs and are stored in specific program code segments of the processing unit 11.

The keyword trimming unit 41 performs so-called data cleaning process and outputs a document-word pairs 51 and document metaphor information 52. In this example, the keyword trimming unit 41 removes unnecessary words from the document data 21 and standardizes keywords. The document-word pairs 51 are pairs of documents and keywords that have been trimmed. The document metaphor information 102 is various information of documents (such as URL and title of each document), reading information of keywords, and so forth.

The keyword relation extracting unit 42 calculates a hierarchical relation 53, an equivalent relation 54, and an associative relation 55 between keywords with the data 32 and the data 51. These relations represent that two or more keywords have a particular relation.

The hierarchical relation 53 is data that represents a hierarchical relation of concepts of keywords. The equivalent relation 54 is data that represents an equivalent level relation of concepts of keywords. For example, keywords included in a set of synonyms have an equivalent relation. The associative relation 55 is data that represents a relation of which one keyword is associated with another word when these keywords have neither a hierarchical relation, nor an equivalent relation.

The directory file creating unit 43 creates a hypertext format directory file 56 with the data 33, the data 52, the data 53, the data 54, and the data 55. The directory accessing unit 44 displays the contents of the directory file 56 on the displaying unit 14 corresponding to a user's command that is input from the inputting unit 13 and activates the searching unit 45.

The searching unit 45 searches the directory file 56 and the full text of the contents of the document data 21 corresponding to a user's command. When the searching unit 45 searches the full text of the contents of the document data 21, the searching unit 21 search any character string or any word sequence from the text of the document data 21.

Next, with reference to FIGS. 3 to 5, the data structure of each type of data will be described.

The data 31, data 32, and data 33 included in the management file 22 shown in FIG. 2 are stored in three tables shown in FIG. 3. The synonym/unnecessary word table 31 shown in FIG. 3 represents combinations of [representative word ID, a set of synonym/unnecessary word IDs]. For example, a keyword of representative word ID=005 has a relation of a synonym to keywords of ID=010, 021, and 022. When a representative word ID is empty, a set of IDs (ID=077 and 082) are unnecessary words.

The hierarchical relation table 32 represents combinations of [higher word ID, a set of lower word IDs]. For example, a keyword of higher word ID=002 has a hierarchical relation to keywords of ID=004 and 008 as lower words. A top keyword ID list 33 represents a sequence of IDs of keywords used as a top directory (ID=001, 008, . . . ).

The document-word pairs 51, the hierarchical relation 53, the equivalent relation 54, and the associative relation 55 are stored in two tables shown in FIG. 4. A document-word pair table 61 shown in FIG. 4 contains combinations of [document ID, a set of keyword ID]. A keyword table 62 contains combinations of [keyword ID (KID), keyword, reading information, a set of higher word IDs (UP), a set of lower word IDs (DOWN), a set of associative word IDs (Rel), a set of equivalent keyword IDs (Eq), a path, a new word flag (new)].

A set of higher word IDs and a set of lower word IDs correspond to the hierarchical relation 53. A set of associative word IDs corresponds to the associative relation 55. A set of keyword IDs having an equivalent relation corresponds to the equivalent relation 54. When a keyword corresponds to a new word, the new word flag is set to "1". Otherwise, the new word flag is set to "0".

For example, keywords of ID=000 and 081 are added to a document of document ID=000 in the document-word pair table 61. The keyword of ID=000 corresponds to a katakana character string "スポーツ" in the keyword table 62.

As reading information of the keyword, a hiragana character string すぽーつ or "supootu" has been registered. As higher words of the keyword, two keywords of ID=008 and 022 have been registered. In addition, as a lower word of the keyword, a keyword of ID=025 has been registered. As associative words of the keyword, two keywords of ID=038 and 087 have been registered. In this stage, keywords having an equivalent relation and paths have not been registered.

The new word flag "1" represents that スポーツ is a new word.

The document metaphor information shown in FIG. 2 is stored in the format of a document information table shown in FIG. 5. The document information table 52 contains combinations of [document ID, title, description, update date/time, link to primary information].

The "description" in the document information table 52 corresponds to the summary of a document or the description of the first several lines of the document. The "update date/time" represents the last date/time when the document was updated. The "link to primary information" represents URL on Internet and so forth.

For example, the "title" of a document of document ID=001 is ニュースの読み方. The "description" is "comp,fj をmule から. . . ". The "update date/time" is "1998/2/10 15:38". The "link to primary information" is "http://www.xxxx (URL)".

Next, with reference to FIGS. 6 and 7, the process of the keyword trimming unit 41 will be described in detail.

FIG. 6 is a block diagram showing the structure of the keyword trimming unit 41. The keyword trimming unit 41 shown in FIG. 6 includes a keyword standardizing unit 71 and a word reading information adding unit 72 as sub components. The keyword standardizing unit 71 standardizes (unifies) character codes of given keywords. The word reading information adding unit 72 generates reading information of a given word.

The keyword trimming unit 41 preforms a process shown in FIG. 7 and generates the document-word pairs 51 and the keyword table 62. The document-word pairs 51 are composed of the document-word pair table 61 and the keyword table 62 as shown in FIG. 4.

The keyword standardizing unit 71 standardizes characters of all keywords added to documents of the document data 21 (at step S10). In this case, kanji codes included in keywords are standardized to particular codes such as UNI-CODE. Alternatively, one-byte type katakana/alphanumeric characters are standardized to two-byte type katakana/alphanumeric characters. In addition, symbols and blanks included in keywords are removed. The keyword standardizing unit 71 performs a keyword standardizing process for each character.

Next, the keyword trimming unit 41 adds a keyword ID and a keyword of keyword information of one document to the keyword table 62. In addition, the keyword trimming unit 41 adds the reading information and the new word flag to the keyword table 62 (at step S11).

At this point, with respect to a Japanese keyword, kana or alphabetical characters generated by the word reading information adding unit 72 are added. With respect to an English keyword, the same keyword is added as reading information. When an added keyword has been registered in a set 73 of old keywords, the new word flag is set to "0". When an added keyword has not been registered to the set 73 of old keywords, the new word flag is set to "1". The set 73 of old keywords represents a set of keywords of the keyword table 62 of the previous directory.

Next, the keyword trimming unit 41 adds a document ID and a keyword ID as links to the document metaphor information 52 and the keyword table 62, to the document-word pair table 61 (at step S12). At this point, data of the document is added to the document information table 52.

Next, the keyword trimming unit 41 determines whether or not there is a non-processed document in the document data 21 (at step S13). When there is a non-processed document in the document data 21 (namely, the determined result at step S13 is Yes), the flow returns to step S11. When there is no non-processed document in the document data 21 (namely, the determined result at step S13 is No), the keyword trimming unit 41 adds information of the synonym/unnecessary word table 31 to the keyword table 62 (at step S14).

In this example, the keyword trimming unit 41 adds an ID defined as a synonym to the field Eq of the keyword corresponding to the representative word ID of the table 31. In addition, the keyword trimming unit 41 deletes IDs defined as unnecessary words from entries of the keyword table 62. At this point, the keyword trimming unit 41 deletes IDs of all unnecessary words from the document-word pair table 61. Thus, synonyms defined by the administrator are registered to the keyword table 62. Unnecessary words are deleted from the document-word pair table 61 and the keyword table 62.

With respect of Japanese keywords, when a keyword with a last long sound code "-" (for example コンピューター) and a keyword without a last long sound code (for example コンピュータ) co-exist, the keyword trimming unit 41 standardizes these keywords (at step S15). In this example, the keyword trimming unit 41 registers the keyword ID of コンピュータ to the field Eq of the keyword コンピューター. Thus, the two redundant keywords are degenerated.

The keyword trimming unit 41 performs stemming for English words. For example, if "computer" and "computers" co-exist, the Eq field of the latter keywords is registered as the former keyword ID.

Next, the keyword trimming unit 41 stores the list of keywords of the keyword table 62 as a set 73 of old keywords (at step S16) and completes the process. When the next directory is created, the keyword trimming unit 41 references the set 73 of old keywords at step S11.

Next, with reference to FIGS. 8 to 15, the process of the keyword relation extracting unit 42 will be described in detail.

Figure 8:
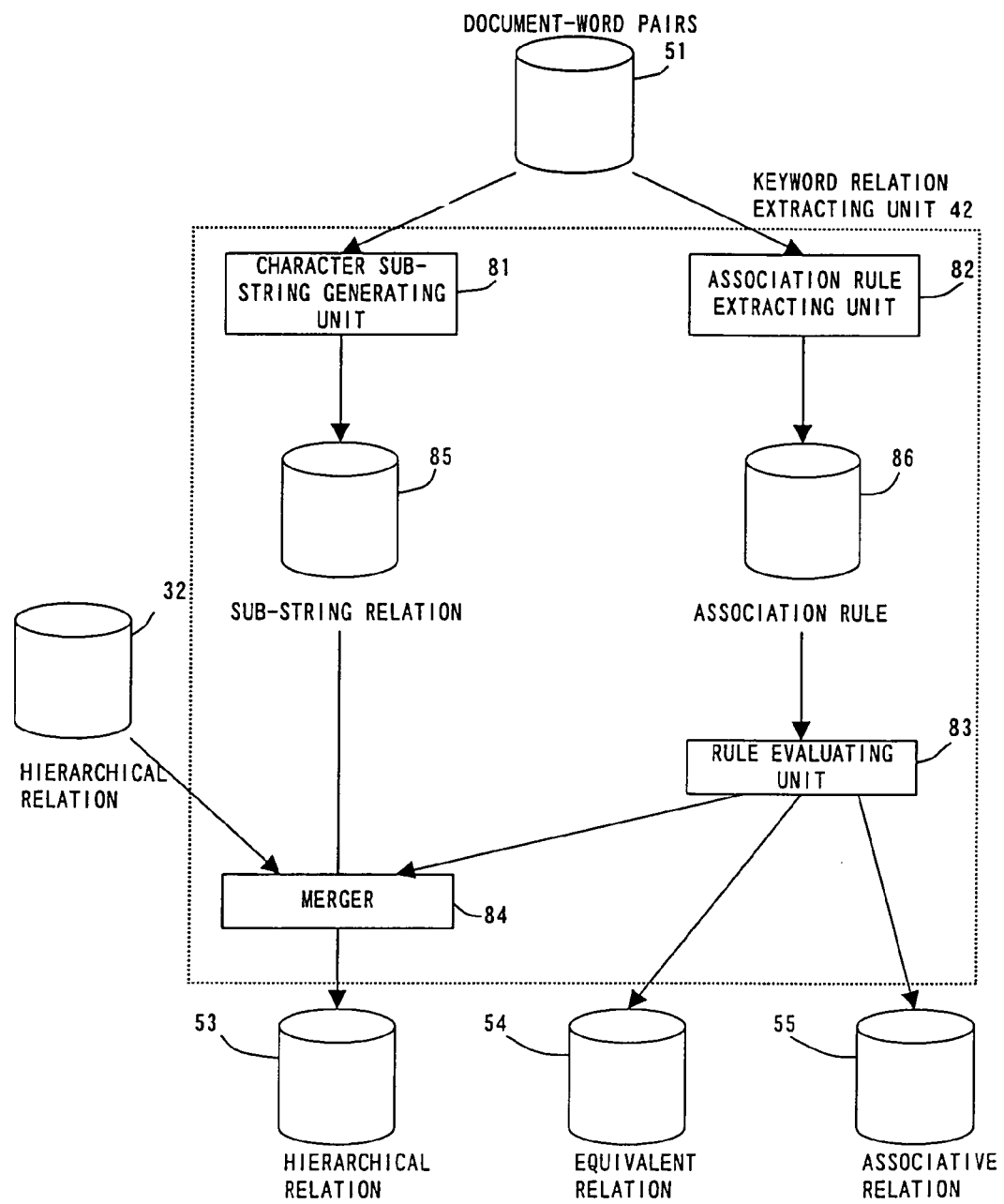
FIG. 8 is a block diagram showing the structure of a keyword relation extracting unit.

FIG. 8 is a block diagram showing the structure of the keyword relation extracting unit 42. The keyword relation extracting unit 42 shown in FIG. 8 comprises a character sub-string generating unit 81, an association rule extracting unit 82, a rule evaluating unit 83, and a merger 84. The keyword relation extracting unit 42 generates the hierarchical relation 53, the equivalent relation 54, and the associative relation 55 with the document-word pairs 51 (corresponding to the document-word pair table 61 and the keyword table 62 shown in FIG. 4) and the hierarchical relation 32 defined by the administrator.

The character sub-string generating unit 81 divides a keyword as a composite phrase into appropriate character strings and generates sub-string relation data 85. The data 85 represents the relation of which one keyword contains another keyword as with "information retrieval" and "information"/"retrieval".

The association rule extracting unit 82 extracts an association rule 86 that represents the relation between keywords with occurrence frequencies of keywords. The rule evaluating unit 83 evaluates an association rule 86 and divides it into the hierarchical relation 53, the equivalent relation 54, and the associative relation 55. The merger 84 merges the hierarchical relation 32, the character sub-string relation 85, and the hierarchical relation generated by the rule evaluating unit 83 and generates the hierarchical relation 53.

Figure 9:
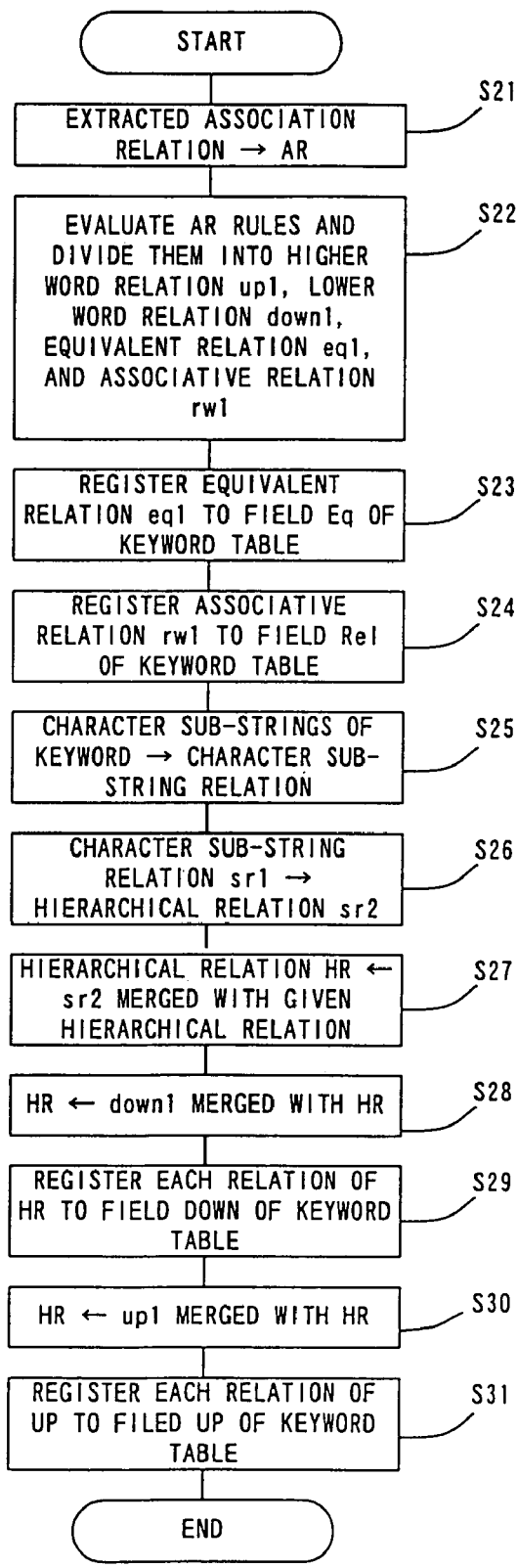
FIG. 9 is a flowchart showing the process of the keyword relation extracting unit.

FIG. 9 is a flowchart showing the process of the keyword relation extracting unit 42. First of all, the association rule extracting unit 82 extracts the association rule 86 from the document-word pair table 61 and the keyword table 62 as a set AR of association rules (at step S21).

Next, the rule evaluating unit 83 evaluates rules corresponding to AR and divides the rules into a higher word relation up1, a lower word relation down1, an equivalent relation eq1, and an associative relation rw1 (at step S22). For two keywords w1 and w2, the higher word relation up1 and the lower word relation down1 are described as "w1>w2" (where w1 is a higher word of w2; alternatively, w2 is a lower word of w1). The equivalent relation eq1 is described as "w1=w2". The associative relation rw1 is described as "w1~w2".

Next, the rule evaluating unit 83 registers the equivalent relation eq1 to the field Eq of the keyword tale 62 (at step S23). The equivalent relation eq1 is a set of relations between keywords as with "w1=w2". Thus, the ID of the keyword w2 is added to the entry of the field Eq of the keyword w1.

Next, the rule evaluating unit 83 registers the associative relation rw1 to the field Rel of the keyword table 62 (at step S24). The associative relation rw1 is a set of relations between keywords as with "w1~w2". The ID of the keyword w2 is added to the entry of the field Rel of the keyword w1.

Next, the character sub-string generating unit 81 divides a keyword of the keyword table 62 into character sub-strings and generates a character sub-string relation 85 that represents the inclusion relation of the keyword and the divided character sub-strings (at step S25). A set of character sub-string relations is denoted by sr1. The set sr1 represents that "computer" and "graphics" are character sub-strings of "computer graphics", for example.

Next, the merger 84 references the character sub-string relation sr1. When the keyword kw contains character sub-strings $w_1, w_2, \ldots, w_n$, the merger 84 converts the sub-string relation into "$w_i$>kw" that represents that $w_i$ is a higher word of kw (where i=1, 2, . . . , n) (at step S26). The resultant set of hierarchical relations is denoted by sr2.

Next, the merger 84 merges sr2 to the hierarchical relation 32 defined by the administrator and represents the resultant hierarchical relation as HR (at step S27). When another hierarchical relation S2 is merged to a particular hierarchical relation S1, elements of S2 which are not contradictory to the elements of S1 are added to S1. For example, when S1 includes neither an element "w1>w2" of S2, nor an element of "w2>w1", the element "w1>w2" is added to S1.

In this case, since the hierarchical relation 32 is prior to sr2, elements of sr2 that are contradictory to elements of the hierarchical relation 32 are not added to the hierarchical relation 32. For example, when the hierarchical relation 32 is {computer>software, computer>hardware, software>groupware, global network>network} and sr2 is {computer>personal computer, network>global network}, the merged result of sr2 to the hierarchical relation 32 is {computer>software, computer>hardware, computer>personal computer, software>groupware, global network>network}.

Next, the merger 84 merges the lower word relation down1 obtained at step S22 to HR and designates the result as HR (at step S28). Thus, the hierarchical relation sr2 obtained with the inclusion relation of the character string has a priority over the hierarchical relation down1 obtained by the rule evaluation.

Thereafter, the merger 84 adds the ID of the keyword w2 to the field DOWN of the record of the keyword w1 of the keyword table 62 for each element "w1>w2" of HR (at step S29).

Next, the merger 84 merges the higher word relation up1 obtained at step S22 to HR and designates the result as HR (at step S30). Thus, the higher hierarchical relation is included in HR.

Thereafter, the merger 84 adds the ID of the keyword w1 to the field UP of the record of the keyword w2 of the keyword table 62 for each element "w1>w2" of HR (at step S31) and then completes the process.

Figure 10:
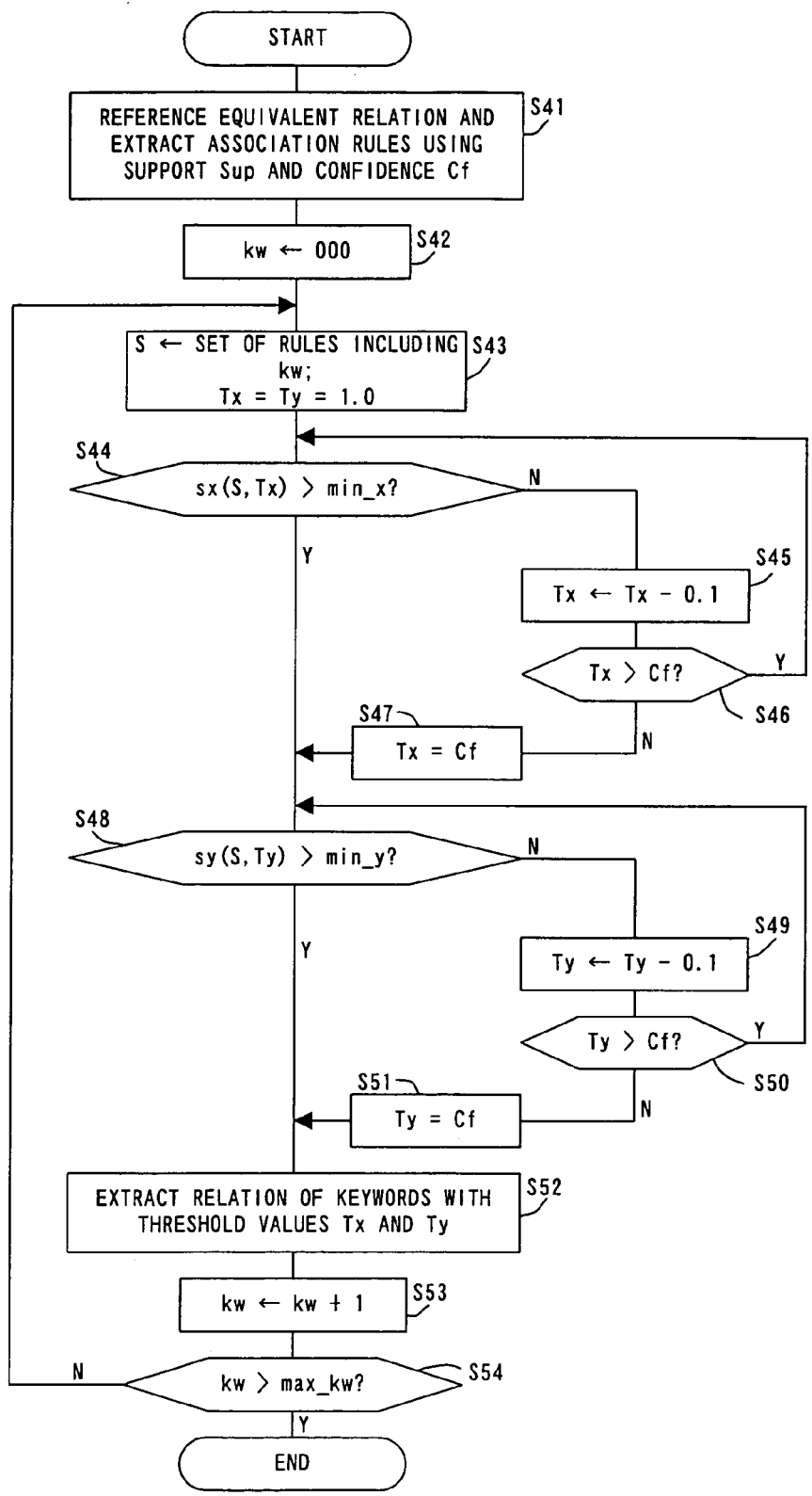
FIG. 10 is a flowchart showing an association rule extracting/evaluating process.

FIG. 10 is a flowchart showing the association rule extracting process (at step S21 shown in FIG. 9) and the rule evaluating process (at step S22 shown in FIG. 9). In this example, input data is the document-word pair table 61 and the keyword table 62 of which keywords have been trimmed.

The association rule extracting unit 82 references the equivalent relation of the keyword table 62, generates a set of keywords of which the equivalent relation is removed for each document, and extracts an association rule corresponding to a predetermined association rule extracting algorithm of data mining (at step S41).

The set of keywords of which the equivalent relation is removed represents a set of keywords obtained by adding keywords of each document registered in the document-word pair table 61 and keywords registered in the field Eq thereof and removing redundant keywords from the addition result.

In the association rule extracting algorithm, a rule H→B is extracted from pairs of a document and a set of keywords based on statistical information of a keyword pair (H, B). The rule H→B depends on a support sup (H→B) and a confidence conf (H→B) (where sup (H→B) represents the cooccurrence frequency of the keyword pair (H, B) called support; and conf (H→B) represents confidence). These values are defined as follows.

sup (H→B)
=[the number of documents that have H and B/the total number of documents]
conf (H→B)
=[the number of documents that have H and B/the number of documents that have H]

At step S41, the rule evaluating unit 83 extracts combinations of keywords H and B that satisfy the relations of [sup (H→B)≧Sup] and [conf (H→B)≧Cf] as rules (where Sup and Cf are appropriate threshold values).

Next, the rule evaluating unit 83 divides the set of extracted rules, extracts a hierarchical relation, an equivalent relation, and an associative relation between keywords, thereby automatically estimates the relation of a keyword pair included in each rule.

Figure 11:
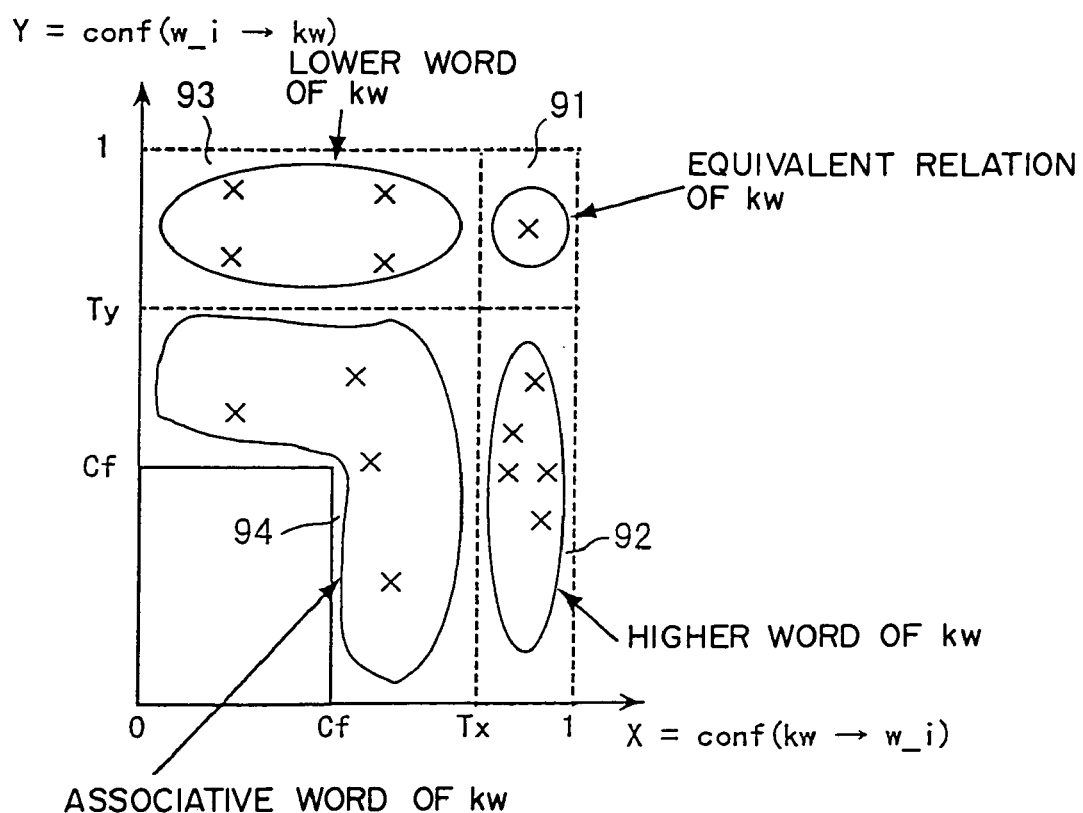
FIG. 11 is a schematic diagram showing a rule diving process.

In this example, kw and $w_i(w\_i)$ represent keyword IDs included in a rule. The values of conf(kw→$w_i$) are plotted on the X axis and the values of conf($w_i$→kw) on the Y axis. In other words, the XY plane with respect to the confidence is considered as shown in FIG. 11.

At this point, for all combinations of kw and $w_i$ included in the set of rules, the relations of [Cf≦conf(kw→$w_i$)≦1] and [Cf≦conf($w_i$→kw)≦1] are satisfied. Thus, for each $w_i$, the rule evaluating unit 83 plots points (X, Y)=(conf (kw→$w_i$), conf($w_i$→kw)) on the XY plane. Thus, as shown in FIG. 11, dots denoted by "x" are distributed in an area surrounded with X axis, Y axis, straight line X=Cf, straight line X=1, straight line Y=Cf, and straight line Y=1.

The rule evaluating unit 83 divides the area into sub areas 91, 92, 93, and 94 with straight lines X=Tx and Y=Ty (where Tx and Ty are appropriate threshold values) and assigns a hierarchical relation, an equivalent relation, and an associative relation with kw to $w_i$ of the sub areas 91, 92, 93, and 94.

The rule evaluating unit 83 sets the variable kw to 000 (the minimum value of the keyword ID) (at step S42). The rule evaluating unit 83 designates a set of rules that have kw on the left side or right side to S. In addition, the rule evaluating unit 83 sets the initial values of the variables Tx and Ty to 1 (at step S43).

Next, the rule evaluating unit 83 obtains the number sx(S, Tx) of $w_i$ included in rules that satisfy [conf(kw→$w_i$)>Tx] from the elements of the set S and gradually decreases the value of Tx until sx(S, Tx) exceeds a predetermined value $min_x$ (min_x) (at steps S44 to S47). Thus, the rule evaluating unit 83 decides Tx so that the number of keywords in both the sub areas 91 and 92 shown in FIG. 11 becomes $min_x$ or more (in this case, Tx is larger than the minimum confidence Cf).

The rule evaluating unit 83 compares sx(S, Tx) with $min_x$ (at step S44). When sx(S, Tx) is equal to or smaller than $min_x$, the rule evaluating unit 83 decreases the value of Tx by 0.1 (at step S45). Thereafter, the rule evaluating unit 83 compares Tx with Cf (at step S46). When Tx is larger than Cf, the flow returns to step S44. When sx(S, Tx) exceeds $min_x$ at step S44, the flow advances to step S48. When Tx is equal to or smaller than Cf at step S46, the rule evaluating unit 83 sets Tx=Cf (at step S47). Thereafter, the flow advances to step S48.

Next, the rule evaluating unit 83 obtains the number sy(S, Ty) of $w_i$ included in rules that satisfy [conf($w_i$→kw)>Ty] from the elements of the set S and gradually decreases the value of Ty until sy (S, Ty) exceeds a predetermined value $min_y$ (min_y) (at steps S48 to S51). Thus, the rule evaluating unit 83 decides Ty so that the number of keywords in the sub areas 91 and 93 shown in FIG. 11 become $min_y$ or more (in this case, Ty is larger than the minimum confidence Cf).

In this example, the rule evaluating unit 83 compares sy(S, Ty) with $min_y$ (at step S48). When sy (S, Ty) is equal to or smaller than $min_y$, the rule evaluating unit 83 decreases the value of Ty by 0.1 (at step S49). Thereafter, the rule evaluating unit 83 compares Ty with Cf (at step S50). When Ty is larger than Cf, the flow returns to step S48. When sy(S, Ty) is larger than $min_y$, the flow advances to step S52. When Ty is equal to or smaller than Cf at step S50, the rule evaluating unit 83 sets Ty=Cf (at step S51). Thereafter, the flow advances to step S52.

Next, the rule evaluating unit 83 plots points (X, Y)=(conf (kw→$w_i$), conf ($w_i$→kw)) that represent the confidence with respect to kw on the XY plane as shown in FIG. 11 (at step S52).

Figure 12:
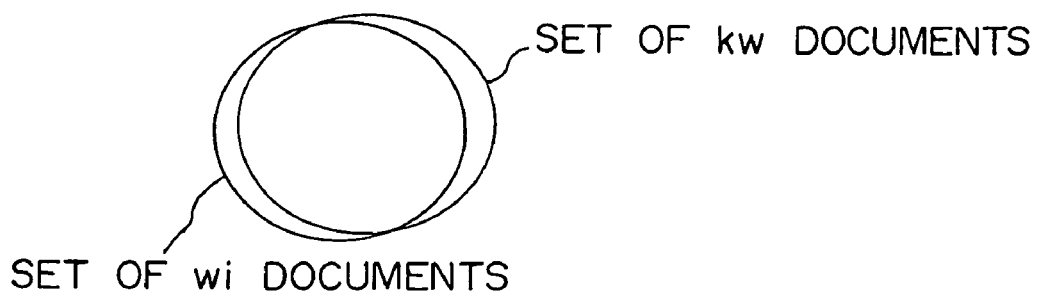
FIG. 12 is a schematic diagram showing the relation of a first set of documents.

At this point, the values of X and Y at each point included in the upper right rectangle sub area 91 are close to 1 (namely, these values are large). As shown in FIG. 12, it is supposed that a set of $w_i$ documents (namely, a set of documents with the keyword $w_i$) almost matches a set of kw documents. Thus, it is assumed that $w_i$ has an equivalent relation with kw.

Figure 13:
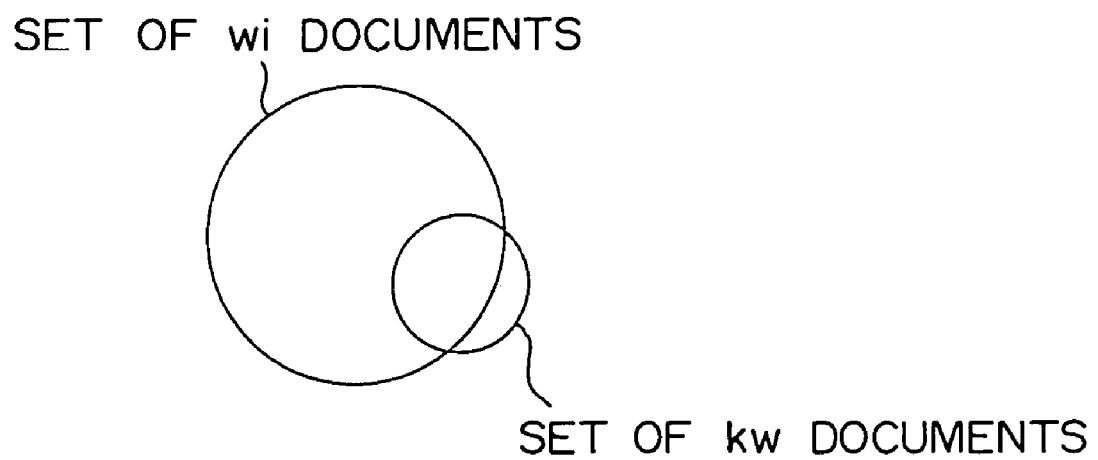
FIG. 13 is a schematic diagram showing the relation of a second set of documents.

The values of X and Y at each point included in the lower right rectangular sub area 92 are close to 1 and small, respectively. Thus, as shown in FIG. 13, it is supposed that the set of $w_i$ documents almost includes the set of kw documents. Thus, it is assumed that $w_i$ is a higher word of kw.

Figure 14:
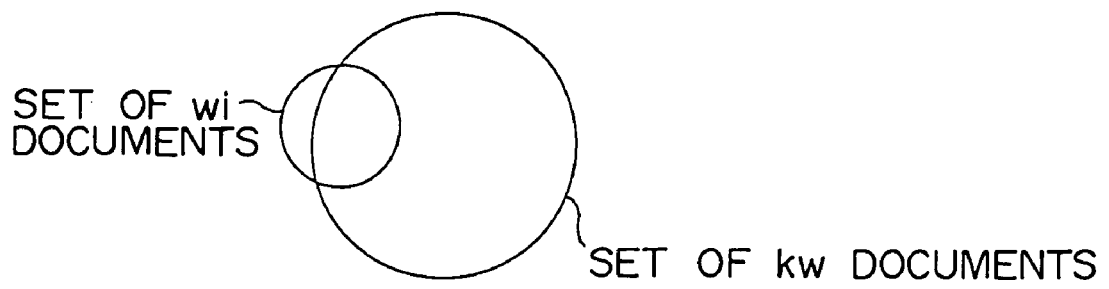
FIG. 14 is a schematic diagram showing the relation of a third set of documents.

The values of Y and X at each point included in the upper left rectangular are 93 are close to 1 and small, respectively. Thus, as shown in FIG. 14, it is supposed that the set of $w_i$ documents is almost included in the set of kw documents. Consequently, it is assumed that $w_i$ is a lower word of kw.

Figure 15:
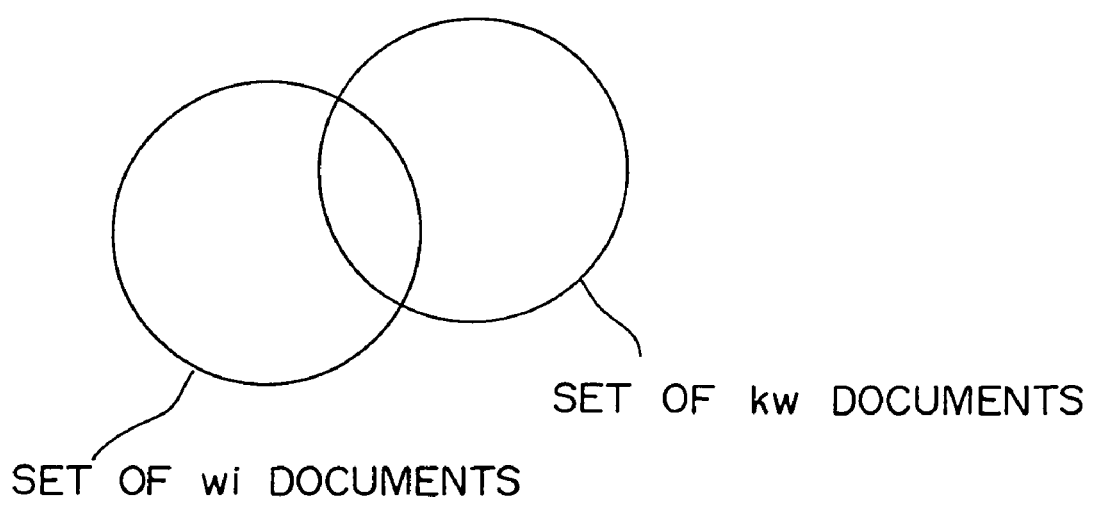
FIG. 15 is a schematic diagram showing the relation of a fourth set of documents.

The values of X and Y at each point included in the lower left sub area 94 are small. However, since the confidences are equal to or larger than Cf, although the set of $w_i$ documents does not have the above-described relations with the set of kw documents, as shown in FIG. 15, it is assumed that w have a particular relation with kw. Thus, it is assumed that $w_i$ is an associative word of kw.

Consequently, the rule evaluating unit 83 divides the elements of the set S into four groups. In addition, the rule evaluating unit 83 adds an equivalent relation "kw=$w_i$" to eq1 for $w_i$ in the sub area 91, an associative relation "kw~$w_i$" to rw1 for $w_i$ in the sub area 94, a higher word relation "$w_i$>kw" to up1 for $w_i$ in the sub area 92, and a lower word relation "kw>$w_i$" to down1 for $w_i$ in the sub area 93. Thus, the rule evaluating unit 83 extracts all the relations between keywords with respect to kw. It is assumed that an equivalent relation is included in a hierarchical relation in a broad sense along with a higher word relation and a lower word relation.

Next, the rule evaluating unit 83 adds 1 to kw (at step S53) and compares kw with the maximum value $\max_{kw}$ (max_kw) of the keyword ID (at step S54). When kw is not larger than $\max_{kw}$, the flow returns to step S43. When kw is larger than $\max_{kw}$, the rule evaluating unit 83 completes the process.

Next, with reference to FIGS. 16 to 19, the process of the directory file creating unit 43 will be descried in detail.

The directory file creating unit 43 creates a directory file 56 with the hierarchical relation 53, the equivalent relation 54, and the associative relation 55 generated by the keyword relation extracting unit 42, the top keyword ID list 33 given by the administrator, and the document metaphor information 52 generated by the keyword trimming unit 41.

Figure 16:
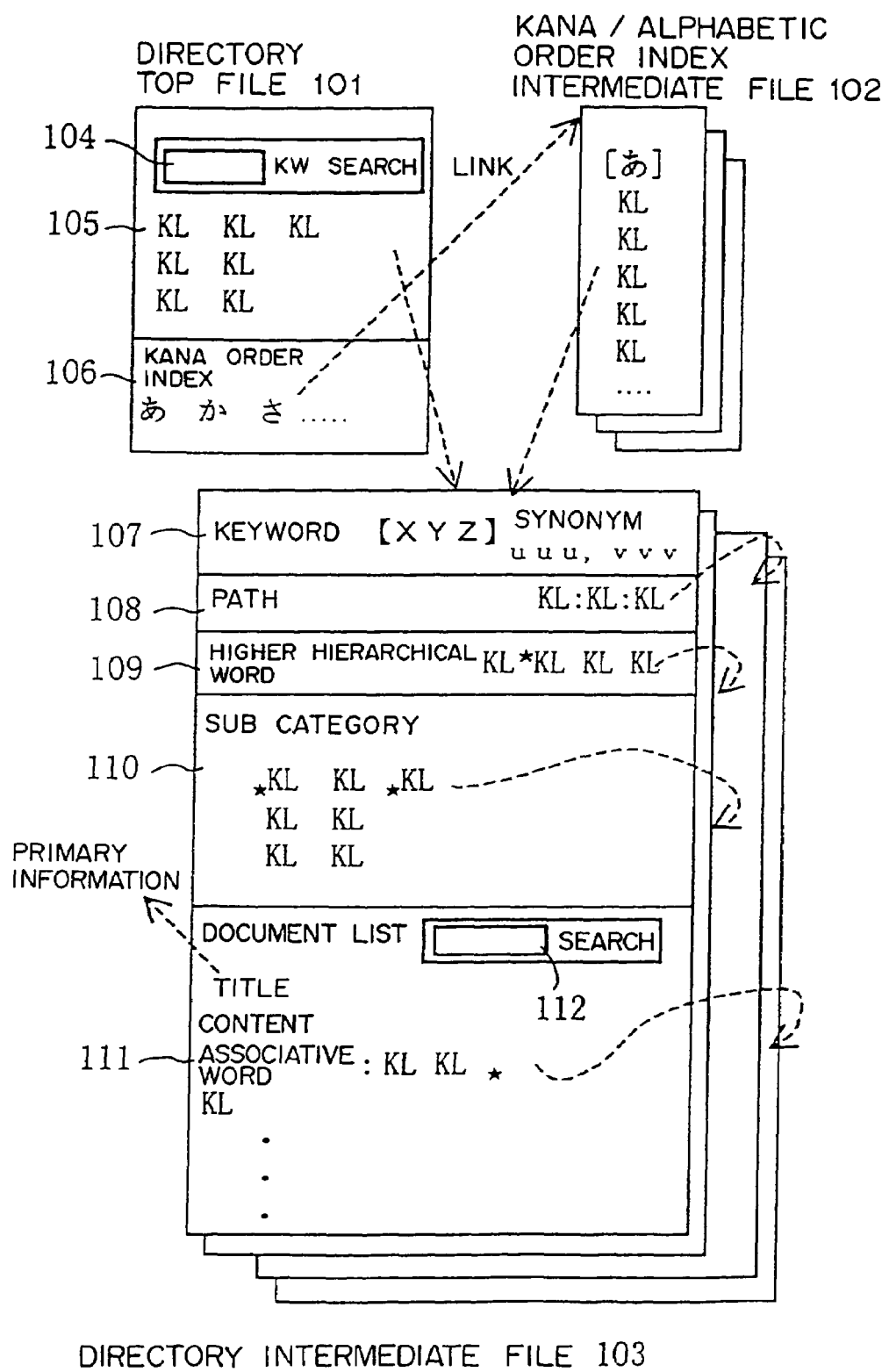
FIG. 16 is a schematic diagram showing the structure of a directory file.

The directory file 56 is composed of three types of hypertext files 101, 102, and 103 shown in FIG. 16. The hypertext files 101, 102, and 103 are linked each other.

In FIG. 16, the directory top file 101 is a file corresponding to the entry of the directory. The file 101 includes a keyword searching input window 104, a top keyword 105 (KL), and a kana/alphabetic order index 106. Each keyword of the top keyword 105 is linked to the directory intermediate file 103. Each entry of the kana/alphabetic order index 106 is linked to the kana/alphabetic order index intermediate file 102.

The kana/alphabetic order index intermediate file 102 is divided into a plurality of files corresponding to reading of keywords. Keywords KL of each file are linked to the directory intermediate files 103.

The directory intermediate file 103 is created for each keyword. The directory intermediate file 103 is composed of a header 107, a path 108, a higher hierarchical word 109, a sub category 110, and a document list 111.

The header 107 includes a keyword (as the title of the file 103) and a synonym list thereof. The path 108 represents a path from the top keyword to the relevant keyword as a sequence of keywords. Each keyword KL of the sequence of the path 108 is linked to the directory intermediate file 103 of the keyword KL.

The higher hierarchical word 109 represents a sequence of upper keywords. The sub category 110 represents a sequence of lower keywords. Each keyword KL of the sequences is linked to the directory intermediate file 103 of the keyword KL.

The document list 111 includes the title and content of each document correlated to the keyword. The title is linked to primary information (URL or the like) of the document. A keyword that is assigned to each document and that has an associative relation to the keyword of the file is represented as an associative word. Each associative word is linked to the directory intermediate file 103 thereof. A searching window 112 is an input window for searching the content of the document.

In FIG. 16, a keyword with a symbol "★" is a new word. This symbol is added to a keyword of which the field new is set to "1" in the keyword table 62 shown in FIG. 4. This symbol emphasizes that the word is a new word.

FIG. 17 is a flowchart showing the process of the directory file creating unit 43. The directory file creating unit 43 creates the directory top file 101 and writes a keyword of the data 33 to the area 105 (at step S61). In addition, the directory file creating unit 43 writes a link to the kana/alphabetic order index intermediate file 102 to the area 106.

Next, the directory file creating unit 43 creates the kana/alphabetic order index intermediate file 102, obtains the reading information registered in the keyword table 62, and stores keywords with the same reading information to the file 102 (at step S62).

Next, the directory file creating unit 43 calculates the shortest path from the top keyword to each keyword and registers the result to the path field of the keyword table 62 (at step S63). In addition, the directory file creating unit 43 creates the directory intermediate file 103 for each keyword (at step S64) and then completes the process.

At step S64, the directory file creating unit 43 writes the keywords registered in the field Eq of the keyword table 62 to the area 107, writes the calculated shortest path to the area 108, writes the keywords registered to the field UP of the keyword table 62 to the area 109, and writes the keywords registered to the field DOWN to the area 110.

In addition, the directory file creating unit 43 obtains the ID of the document with the title keyword of the file 103 from the document-word pair table 61, obtains the title of the document, the description thereof, and the link to the primary information from the document information table 52, and writes the results to the area 111. At this point, the directory file creating unit 43 writes the keywords registered in the field Rel of the keyword table 62 as associative words. Thus, when the file 103 is created, only the path 108 is information that is newly generated.

Although a keyword is searched starting from the top keyword through a hierarchical path, a particular keyword may not be searched since it is not always guaranteed that all keywords are searched with the hierarchical relation from the top. In this case, a keyword may be searched considering an associative relation along with a hierarchical relation.

A path is used to prevent the user from getting lost in hypertexts. In the embodiment, the user can reversely trace a path so as to reach the top keyword from a particular keyword.

Figure 18:
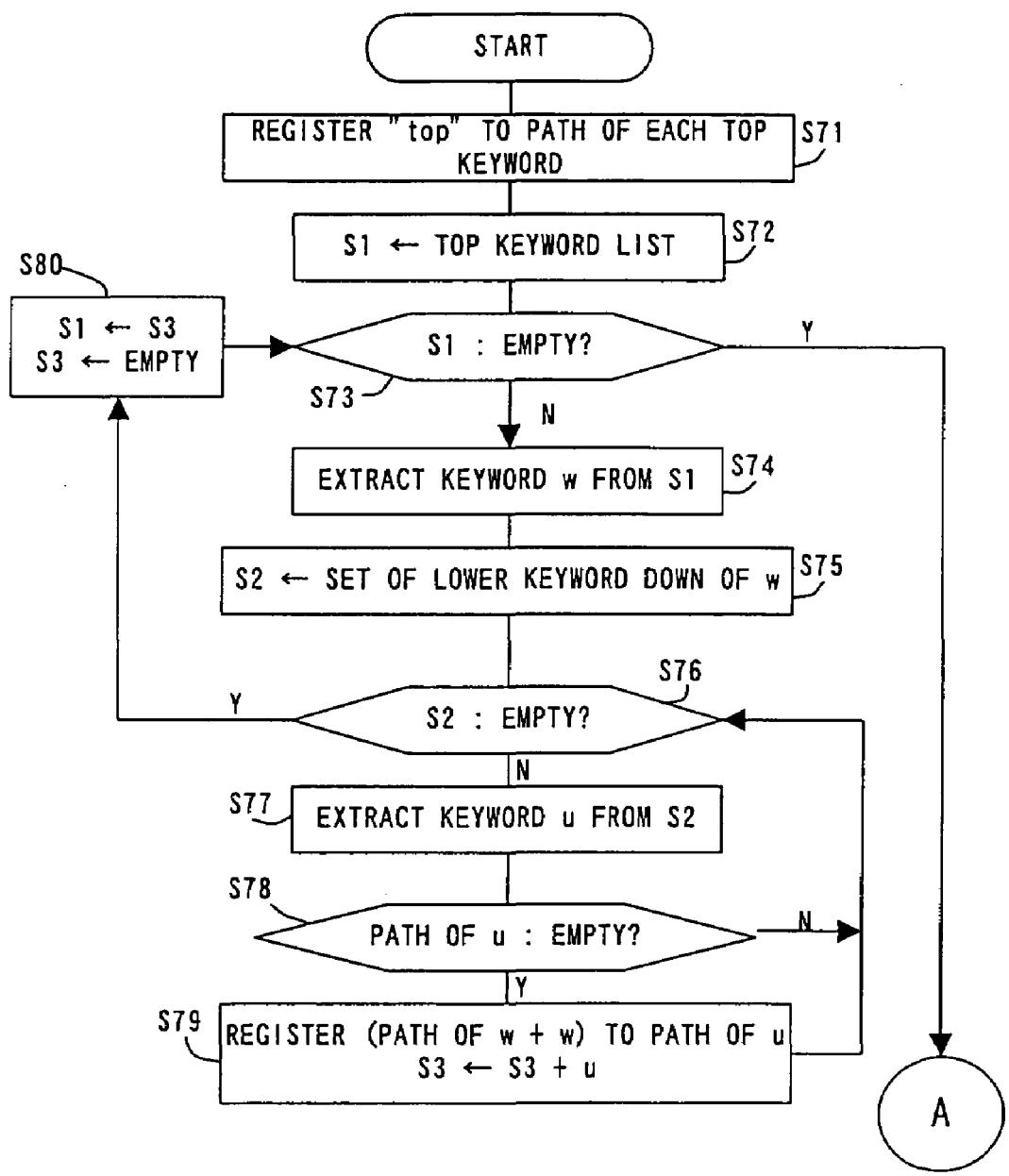
FIG. 18 is a first part of a flowchart showing a path generating process.
Figure 19:
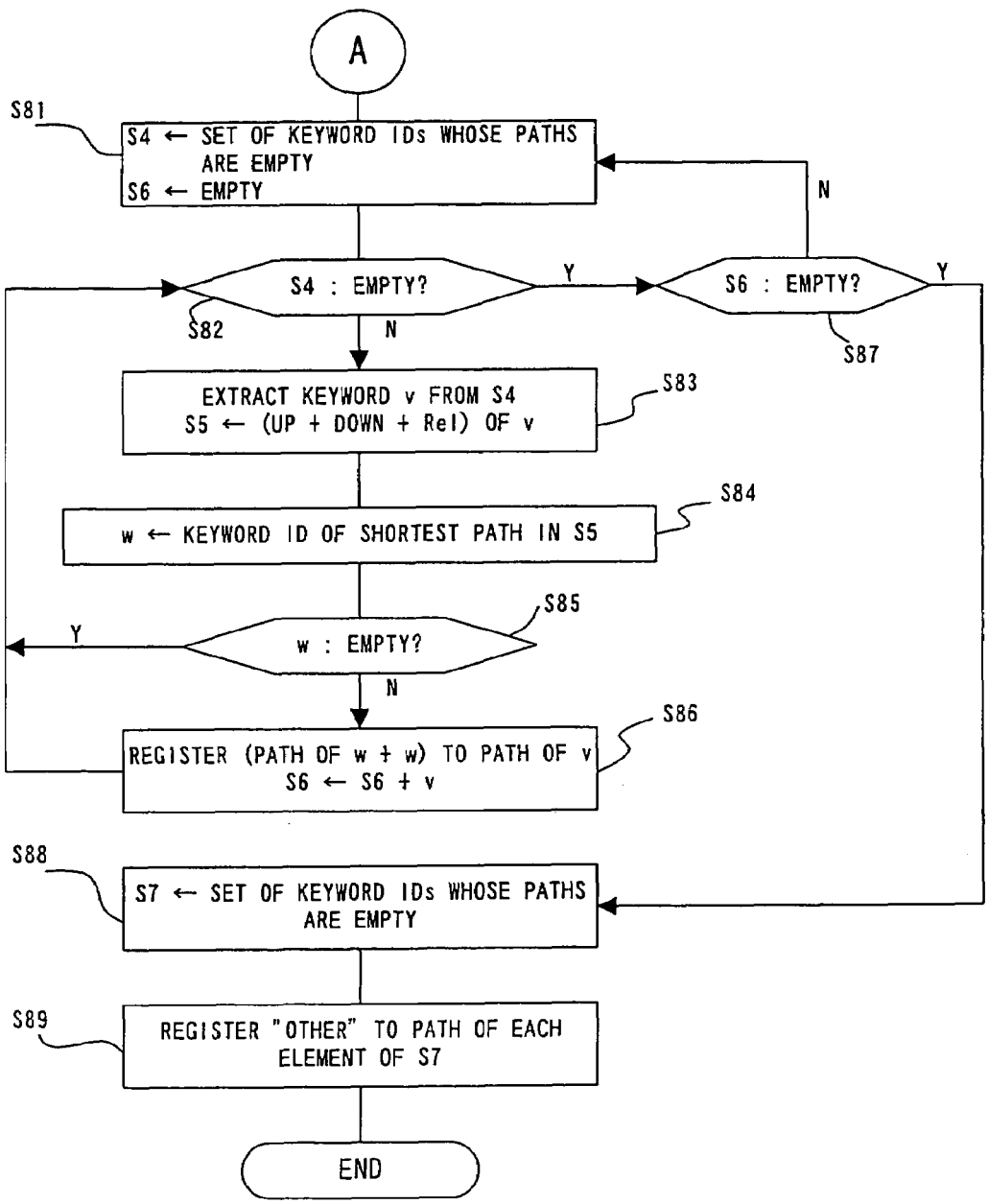
FIG. 19 is a second part of a flowchart showing the path generating process.

FIGS. 18 and 19 are flowcharts showing the path generating process at step S63 shown in FIG. 17. In this process, the directory file creating unit 43 tries to generate a path only with a hierarchical relation. For a keyword whose path has not been generated, the directory file creating unit 43 tries to generate a path considering an associative relation. For a keyword that cannot be linked to the top even considering the associative relation, the directory file creating unit 43 generates a category "other" just below the top and directly links the relevant keyword to the category "other".

The directory file creating unit 43 registers "top" to the path field of the keyword table 62 for each keyword of the top keyword ID list 33 (at step S71 shown in FIG. 18) and designates the list of the top key words as S1 (at step S72).

Next, the directory file creating unit 43 sets a path only with a hierarchical relation (at steps S73 to S80). In this example, the directory file creating unit 43 searches keywords with the width-first method. A keyword with the longest path at each time point is included in S1.

The directory file creating unit 43 determines whether or not S1 is empty (at step S73). When S1 is not empty, the directory file creating unit 43 extracts a keyword w from S1 (at step S74). The directory file creating unit 43 designates a set of keywords registered in the field DOWN of the keyword w of the keyword table 62 as S2 (at step S75).

Next, the directory file creating unit 43 determines whether or not S2 is empty (at step S76). When S2 is not empty, the directory file creating unit 43 extracts a keyword u from S2 (at step S77). Next, the directory file creating unit 43 determines whether or not the path field of the keyword u is empty (at step S78).

When the path of the keyword u has not been set, the directory file creating unit 43 sets (the path of w+w) as the path of the keyword u and adds the keyword u to S3 (at step S79). Thereafter, the flow returns to step S76. S3 represents a set of keywords whose paths have been set. Initially, S3 is empty. When the path of the keyword u has been set at step S78, the flow returns to step S76.

When S2 is empty at step S76, the directory file creating unit 43 designates S3 as S1 and sets S3 to empty (at step S80). Thereafter, the flow returns to step S73. Thus, paths are set to individual nodes from the top of the tree structure of keywords to the bottom thereof.

When S1 is empty at step S73, the directory file creating unit 43 sets a path to a keyword whose path has not been set in the keyword table 62 using a hierarchical relation and an associative relation (at steps S81 to S89 shown in FIG. 9).

The directory file creating unit 43 designates a set of keywords whose paths have not been set as S4 and sets S6 to empty (at step S81). Thereafter, the directory file creating unit 43 determines whether or not S4 is empty (at step S82). When S4 is not empty, the directory file creating unit 43 extracts a keyword v from S4 and designates a set of keywords generated by merging the fields UP, DOWN, and Rel of the keyword v as S5 (at step S83).

Next, the directory file creating unit 43 designates a keyword with the shortest path in the keywords of S5 as w (at step S84). When all paths of the keywords of S5 are empty, w is also empty.

Next, the directory file creating unit 43 determines whether or not the keyword w is empty (at step S85). When the keyword w is not empty, the directory file creating unit 43 sets (the path of w+w) as a path of the keyword v and adds the keyword v to S6 (at step S86). Thereafter, the flow returns to step S82. When the keyword w is empty, the flow returns to step S82.

When S4 is empty at step S82, the directory file creating unit 43 determines whether or not S6 is empty (at step S87). When S6 is not empty, the flow returns to step S81.

When S6 is empty at step S87, the directory file creating unit 43 determines that a new path has not been set and designates a set of keywords whose paths have not been set as S7 (at step S88). Thereafter, the directory file creating unit 43 sets a category "other" just below the top to the path field of each keyword of S7 and then completes the process. Thus, paths are set to all keywords of the keyword table 62.

When the directory file 56 shown in FIG. 16 is created, documents are completely classified and registered. Thus, the user can obtain desired information from the directory file 56 through the directory accessing unit 44 and the searching unit 45.

The user may input data to the directory accessing unit 44 by clicking a displayed link or issuing a searching request. When the user clicks a link, the directory accessing unit 44 displays the contents of the files 102 and 103 on the displaying unit 14. The user can use a hypertext index shown in FIG. 16 in the following manner.

1. path: allows the user to know the current position in the hypertexts, thereby preventing him or her from getting lost therein.

2. Higher hierarchical word: allows searched results to be widened as categories of higher or broad concepts relating to a particular keyword.

3. Sub category (lower hierarchical keywords): allows searched result to be narrowed as lower categories of a particular keyword.

4. Associative word: allows the user to browse or jump a hypertext as a category linked through documents. However, the relation of an associative word with a keyword is low.

There are two methods for issuing a search request. These methods are a keyword searching method and a document content searching method. In the keyword searching method, the user inputs a search requirement to the input window 104 on the screen corresponding to the directory top file 101, the directory accessing unit 44 causes the searching unit 45 to search relevant keywords and the displaying unit 14 to display the searched keywords.

In reality, the searching unit 45 searches the keyword table 62 and lists up keywords that satisfy the input requirement. The directory accessing unit 44 adds a link of the directory intermediate file 103 of each keyword to the directory top file 101. In the document content searching method, when the user inputs a search requirement to the input window 112 on the screen corresponding to the directory intermediate file 103, the searching unit 45 lists up documents that satisfy the input requirement. The directory accessing unit 44 displays a list of titles and contents of the documents.

When the user wants to search information of "wax for cars", he or she can search relevant keywords in the keyword searching method with "car" to restrict documents and then search contents of documents in the document content searching method with "wax so as to reduce unnecessary results.

When the user searches documents simply with "wax", the searched results include unnecessary documents of such as "wax for floors" and "wax for skiis". In addition, since a general term such as "car" is not always included as it is in documents relating to cars, even if a Boolean searching operation is performed with a searching expression such as "car AND wax", desired results may not be obtained.

As described above, the document organizing apparatus unifies statistical information of keywords added to documents, an inclusion relation as character strings, and a relation manually given with a dictionary or the like and automatically generates a directory. Only with statistical information, the accuracy of classification is low. When the conventional categories are used, features of documents cannot be adequately expressed. In contrast, according to the embodiment, with a combination of the statistical information and conventional categories, the accuracy of classification can be improved with generality.

The directory service provides the user with a variety of links such as higher hierarchical words, associative words, and a kana/alphabetic order index along with the shortest path and sub categories as well as hierarchical categories. In other words, the directory service provides the user with a plurality of paths to documents so as to assist him or her for easily searching a desired document. Thus, the service focuses on many means that allow the user to easily navigate documents rather than just on classification.

In addition, since the administrator explicitly gives a list of synonyms and unnecessary words and the document organizing apparatus adds/deletes links of keywords corresponding to the list, the intention of the administrator can be reflected to the directory. Since the administrator explicitly gives a hierarchical relation between keywords and the document organizing apparatus creates a directory corresponding to the information of the hierarchical relation, the relation of links of hypertexts can be adjusted.

Further, since the document organizing apparatus compares a newly input keyword with old keywords and highlights a newly registered keyword, the user is provided with a means that allows him or her to know a new topic without an intervention of the administrator.

In addition, since the document organizing apparatus uses keywords of documents as categories of a directory, unlike wise the conventional automatic categorization, improper categories can be prevented from initially taking place. With a combination of a full text searching operation for documents and classification of a directory, a desired topic can be properly retrieved. Thus, improperly searched results due to homonyms can be reduced.

With a combination of a keyword searching operation and a full text searching operation for document contents, the user can search detailed information from related documents.

Next, with reference to FIGS. 20 to 24, an embodiment of a document organizing system utilizing the document organizing apparatus shown in FIG. 2 will be described. In the present network environment, personal documents such as mails and news are often stored in a document folder of a computer. The document organizing system according to the present invention organizes a group of such documents.

Figure 20:
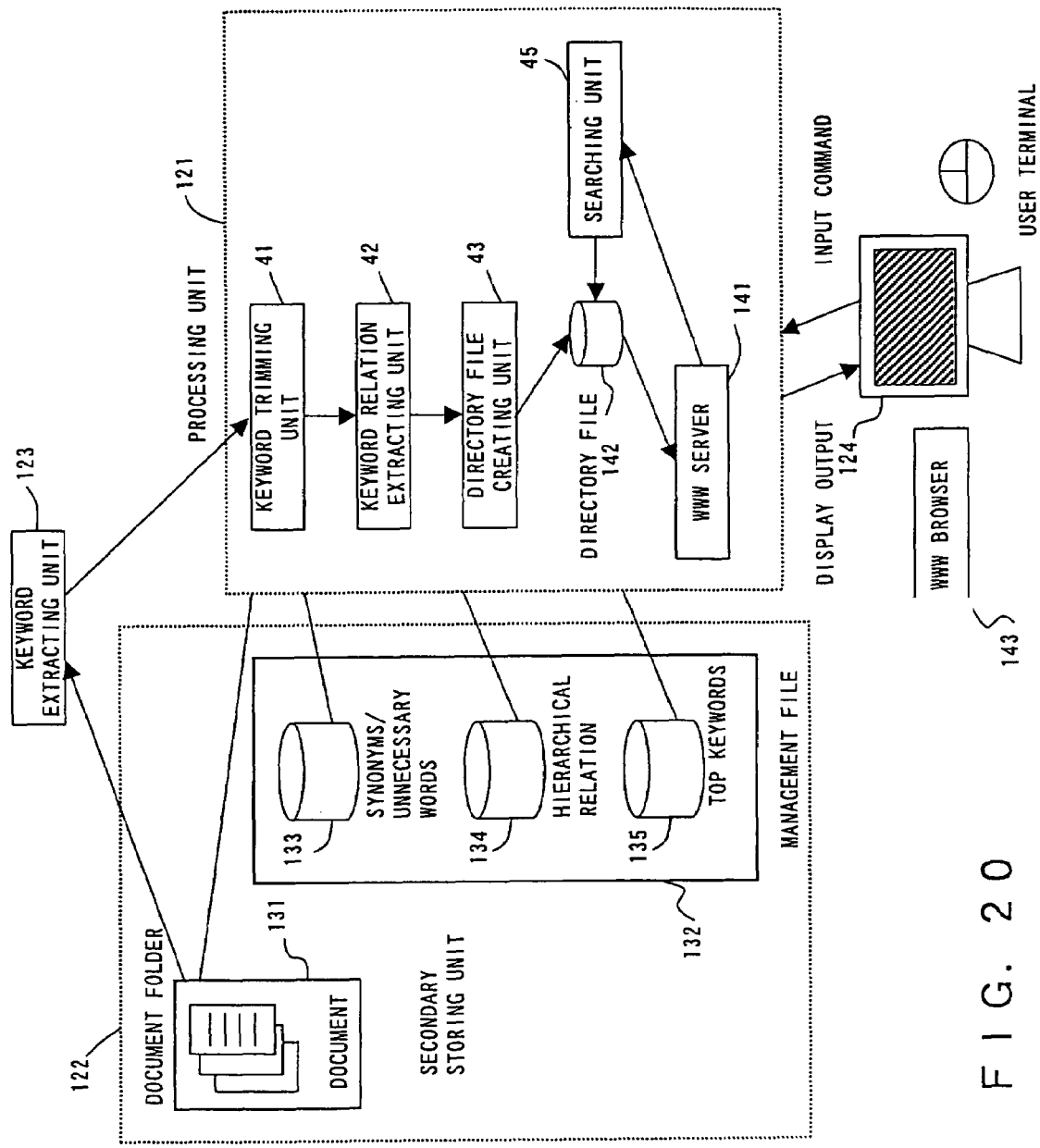
FIG. 20 is a block diagram showing the structure of a document organizing system.

FIG. 20 is a block diagram showing the structure of the document organizing system according to the present invention. The document organizing system shown in FIG. 20 comprises a processing unit 121, a secondary storing unit 122, a keyword extracting unit 123, and a user terminal 124. For example, the processing unit 121 includes a CPU and a memory. The user terminal 124 includes an inputting unit and a displaying unit.

The secondary storing unit 122 stores a document folder 131 and a management file 132. The document folder 131 includes data of a group of documents. The management file 132 includes a set 133 of synonyms and unnecessary words, data 134 representing a hierarchical relation between keywords, and a set 135 of keywords at the top of a directory.

The keyword extracting unit 123 performs a morphemic analysis for each document of the document folder 131 and divides each document into words. Thereafter, the keyword extracting unit 123 extracts a word with an intermediate occurrence frequency as a keyword and supplies the extracted word to the processing unit 121. A word with a low occurrence frequency may not represent the feature of the document. On the other hand, a word with a high occurrence frequency may occur in other documents frequently.

The processing unit 121 comprises a keyword trimming unit 41, a keyword relation extracting unit 42, a directory file creating unit 43, a searching unit 45, and a WWW (World Wide Web) server 141.

The keyword trimming unit 41, the keyword relation extracting unit 42, and the directory file creating unit 43 perform the above-described process with data of the document folder 131 and the management file 132 and keywords extracted by the keyword extracting unit 123 and create a directory file 142 as shown in FIG. 16.

The WWW server 141 corresponds to the directory accessing unit 44 shown in FIG. 2. The WWW server 141 accesses the directory file 142 corresponding to a user's command. The user inputs a command to the WWW server 141 through a WWW browser 143 disposed in the terminal 124 so as to access the directory.

FIG. 21 shows the top screen of the directory displayed on the terminal 124. The items such as "computer" and "software" on the top screen correspond to categories given by the administrator with the top keywords 135.

FIG. 22 shows an intermediate screen of the directory. When the user clicks a keyword on the top screen or another screen, an intermediate screen is displayed. In this example, a page with a keyword "home page" is displayed.

An upper right path 151 represents a path from the top screen to the intermediate screen "home page". Thus, the user can know that the intermediate screen "home page" is just below the keyword "WWW" that is just below the top screen. A related word 152 represents that "page", "Internet", and so forth are higher words of "home page". A sub topic (sub category) 153 represents that 12 keywords such as "WWW page", "network business", and "html" are lower words of "home page".

A document list 154 represents a title, a link to text (primary information), update date, and an associative word for each of 39 documents relating to "home page". For example, "Japan", "electronic mail", and "contribution by proxy" in parentheses below the first document title "WWW page of national astronomical observatory" are associative words of "home page".

Figure 24:
FIG. 24 is a schematic diagram showing an intermediate screen of the kana/alphabetic order index.

FIG. 23 shows a top screen of a kana/alphabetic order index of the directory. FIG. 24 shows an intermediate screen below the top screen. In FIG. 24, keywords starting with "ん" are listed up. With such a document organizing system, any document can be organized and stored.

The document organizing apparatus according to the embodiment can be applied to the following systems.

(1) View of information sharing tool

In a prior application titled "Document Sharing/Organizing System, Shared Document Managing Apparatus, and Document Accessing Apparatus (translated title) (Japanese Patent Application No. 8-281940)" filed by the applicant of the present invention, document information is shared with a group through a network. A view of a list of particular documents can be displayed. As a view, a directory generated by the document organizing apparatus according to the present invention can be displayed.

(2) Network news searching system

In a prior application titled "Related Document Displaying Apparatus (translated title) (Japanese Patent Application No. 10-82270) filed by the applicant of the present invention, a network news searching system has been disclosed.

When network news groups are organized by the document organizing apparatus according to the present invention, user's accessing operation can be assisted.

In the above-described embodiments, the administrator creates a management file. However, the user may have the role of the administrator. In addition, the present invention can be applied to classification and organization of any information with keywords as well as documents. For example, appropriate keywords can be added to image/audio files. With a relation between such keywords, a directory file can be created.

The document organizing apparatus shown in FIG. 2 can be accomplished with an information processing apparatus (computer) shown in FIG. 25. The information processing apparatus shown in FIG. 25 comprises a CPU 161, a memory 162, an inputting unit 163, an outputting unit 164, an external storing unit 165, a medium driving unit 166, and a network connecting unit 167 that are mutually connected with a bus 168.

The memory 162 includes for example a ROM (Read Only Memory), a RAM (Random Access Memory), and so forth. The memory 162 stores a program and data that are used in a process. The CPU 161 executes the program using the memory 162 so as to perform a desired process.

The keyword trimming unit 41, the keyword relation extracting unit 42, the directory file creating unit 43, the directory accessing unit 44, and the searching unit 45 are stored as programs in specific program code segments of the memory 162.

The inputting unit 163 is for example a keyboard, a pointing device, a touch panel, and so forth. The inputting unit 163 is used to input command and information issued by the user. The outputting unit 164 is for example a display, a printer, and so forth. The outputting unit 164 is used to display query messages to the user and processed results.

The external storing unit 165 is for example a magnetic disc unit, an optical disc unit, a magneto-optical disc unit, and so forth. The external storing unit 165 is used as the secondary storing unit 12 shown in FIG. 2. The external storing unit 165 can store the above-described program and data. When necessary, the program and data are loaded from the external storing unit 165 to the memory 162.

The medium driving unit 166 drives a portable recording medium 169 and accesses the content thereof. The portable recording medium 169 is for example a memory card, a flippy disk, a CD-ROM (Compact Disc Read Only Memory), an optical disc, a magneto-optical disc, and so forth from which a computer can read a program and data. The above-described program and data can be stored in the portable recording medium 169. When necessary, the program and data are loaded from the recording medium to the memory 162.

The network connecting unit 167 communicates with an external unit through any network (line) such as LAN (Local Area Network) and converts data. When necessary, the network connecting unit 167 receives the above-described program and data from an external unit and loads them to the memory 162.

Figure 26:
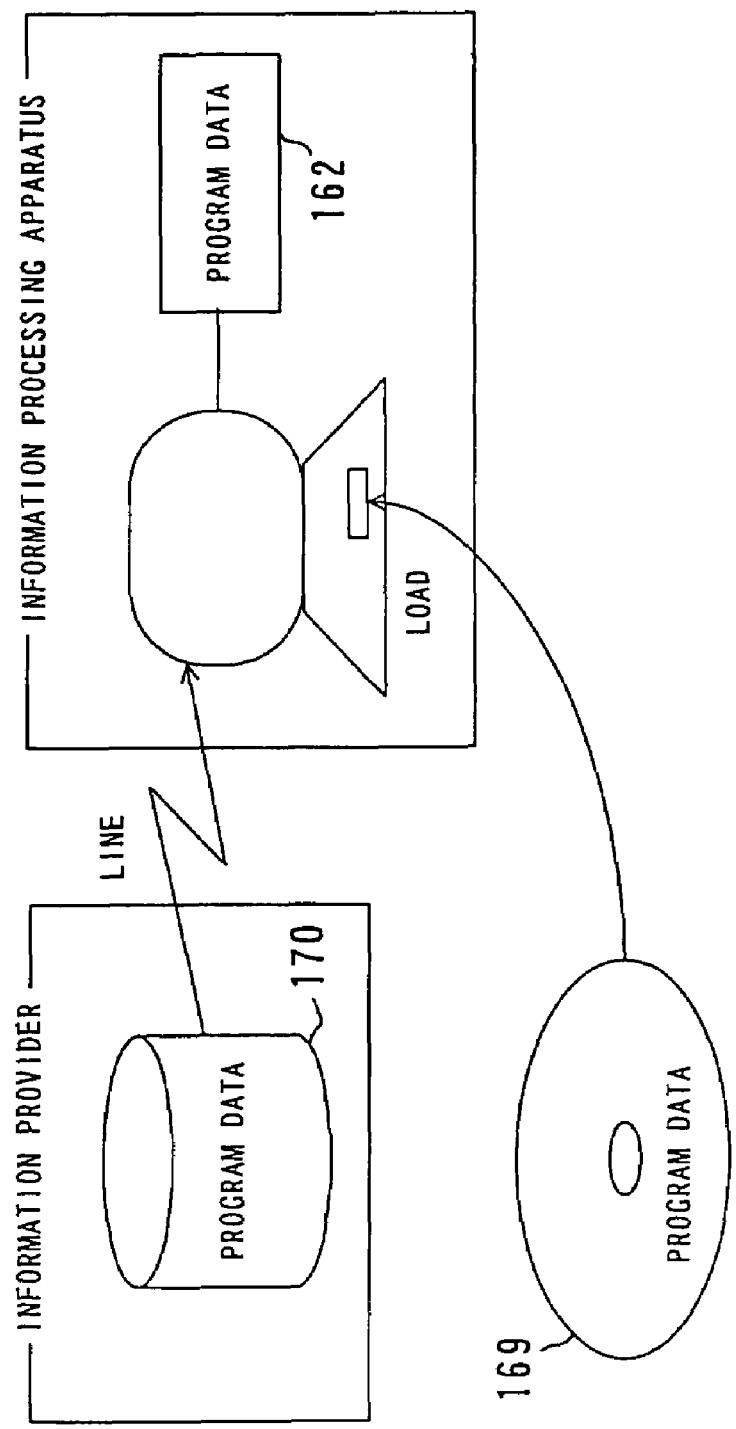
FIG. 26 is a schematic diagram showing recording media.

FIG. 26 shows computer-readable recording media that store a program and data to be supplied to the information processing apparatus shown in FIG. 25. A program and data recorded on a portable recording medium 169 and in an external database 170 are loaded to the memory 162. The CPU 161 executes the program using the data and performs a required process.

According to the present invention, a large number of documents stored as a group in an information processing apparatus can be automatically classified with high accuracy corresponding to categories given from the outside and features extracted from the documents. In addition, corresponding to classification results, a directory with many links to documents is automatically generated. Thus, the accessing operation of the user is assisted.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A document organizing apparatus for organizing a group of documents based on keywords, comprising:
   a relation extracting unit to extract one of a hierarchical relation, an equivalent relation and an associative relation between given keywords as an extracted relation, the hierarchical relation representing a first set of keywords that have concepts with a hierarchical relationship, the equivalent relation representing a second set of keywords that have concepts with a synonymous relationship, and the associative relation representing that a first keyword is associated with a second keyword when the first and second keywords have neither hierarchical nor synonymous relationships;
   a generating unit to generate directory information for accessing the group of documents by using the extracted relation of the hierarchical relation, the equivalent relation and the associative relation as links among keywords; and
   an outputting unit to output the directory information.

2. The document organizing apparatus as set forth in claim 1, wherein said relation extracting unit includes:
   a rule extracting unit to extract an association rule containing a pair of keywords from the given keywords; and
   a rule evaluating unit to evaluate the association rule and to assign one of the extracted relation and an equivalent relation to the pair of keywords.

3. The document organizing apparatus as set forth in claim 2,
   wherein said rule extracting unit extracts a pair of keywords with a high cooccurrence frequency as the association rule, and
   wherein said rule evaluating unit assigns a relation of the extracted pair of keywords thereto based on the high cooccurrence frequency.

4. The document organizing apparatus as set forth in claim 1, wherein said relation extracting unit includes:
   a unit to extract a pair of keywords with a high cooccurrence frequency from the given keywords; and
   a unit to assign one of the extracted relation and an equivalent relation to the pair of keywords based on the high cooccurrence frequency of the pair of keywords.

5. The document organizing apparatus as set forth in claim 1, wherein said relation extracting unit divides one of the given keywords into character sub-strings and extracts an inclusion relation between the given keyword and the character sub-strings as the hierarchical relation.

6. The document organizing apparatus as set forth in claim 1, wherein said relation extracting unit includes:
   a unit to extract the first hierarchical relation from a pair of keywords based on a cooccurrence frequency thereof;

a unit to extract the second hierarchical relation from an inclusion relation between one of the given keywords and character sub-strings thereof; and a unit to merge the first hierarchical relation, the second hierarchical relation, and another hierarchical relation given from outside said document organizing apparatus.

7. The document organizing apparatus as set forth in claim 1, wherein said relation extracting unit extracts both the hierarchical and associative relations, wherein said generating unit generates a hypertext index having at least one of a path from a top category to a directory, a higher hierarchical word of the directory, a sub-category of the directory, an associative word of the directory, and a kana/alphabetic order index, as the directory information using the hierarchical and associative relations, and wherein said outputting unit organizes the group of documents corresponding to the generated hypertext index and outputs an organized result.

8. The document organizing apparatus as set forth in claim 7, wherein said generating unit automatically calculates a path from a keyword of the top category to each keyword using the hierarchical and associative relations and sets an obtained path as the path from the top category to the directory.

9. The document organizing apparatus as set forth in claim 1, further comprising a unit to add an equivalent relation between keywords based on a synonym list given from outside said document organizing apparatus, and wherein said generating unit generates directory information including the equivalent relation.

10. The document organizing apparatus as set forth in claim 1, further comprising a unit to delete a keyword based on an unnecessary word list given from outside said document organizing apparatus, wherein said generating unit generates directory information excluding the deleted keyword.

11. The document organizing apparatus as set forth in claim 1, further comprising a unit to input a given hierarchical relation between keywords, wherein said generating unit generates directory information using the given hierarchical relation.

12. The document organizing apparatus as set forth in claim 1, further comprising:
a unit to store old keywords; and
a comparison unit to compare the given keywords and the old keywords and identifying a new keyword, wherein said outputting unit outputs the new keyword in a highlighted format.

13. The document organizing apparatus as set forth in claim 1, further comprising a unit to access the directory information, and wherein a user accesses the group of documents through the directory information.

14. The document organizing apparatus as set forth in claim 1, further comprising:
a keyword searching unit to search for a keyword included in the directory information; and a document searching unit to search contents of documents in the group of documents, and wherein a user obtains document information using said keyword searching unit and said document searching unit.

15. An information organizing apparatus for organizing arbitrary information based on keywords, comprising:

a relation extracting unit to extract one of a hierarchical relation, an equivalent relation and an associative relation between given keywords as an extracted relation, the hierarchical relation representing a first set of keywords that have concepts with a hierarchical relationship, the equivalent relation representing a second set of keywords that have concepts with a synonymous relationship, and the associative relation representing that a first keyword is associated with a second keyword when the first and second keywords have neither hierarchical nor synonymous relationships;

a generating unit to generate directory information for accessing the arbitrary information by using the extracted relation of the hierarchical relation, the equivalent relation and the associative relation as links among keywords; and an outputting unit to output the directory information.

16. A computer-readable recording medium which stores a program that causes a computer, that organizes a group of documents based on keywords, to perform a method comprising:

extracting one of a hierarchical relation, an equivalent relation and an associative relation between given keywords as an extracted relation, the hierarchical relation representing a first set of keywords that have concepts with a hierarchical relationship, the equivalent relation representing a second set of keywords that have concepts with a synonymous relationship, and the associative relation representing that a first keyword is associated with a second keyword when the first and second keywords have neither hierarchical nor synonymous relationships; and generating directory information for accessing the group of documents by using the extracted relation of the hierarchical relation, the equivalent relation and the associative relation as links among keywords.

17. A document organizing method, comprising:

extracting one of a hierarchical relation, an equivalent relation and an associative relation between given keywords as an extracted relation, the hierarchical relation representing a first set of keywords that have concepts with a hierarchical relationship, the equivalent relation representing a second set of keywords that have concepts with a synonymous relationship, and the associative relation representing that a first keyword is associated with a second keyword when the first and second keywords have neither hierarchical nor synonymous relationships;

generating directory information for accessing the group of documents by using the extracted relation of the hierarchical relation, the equivalent relation and the associative relation as links among keywords; and organizing the group of documents based on the directory information.

* * * * *